(12) United States Patent
Wu

(10) Patent No.: US 12,089,163 B2
(45) Date of Patent: Sep. 10, 2024

(54) SAVING POWER IN A COMMUNICATION DEVICE

(71) Applicant: GOOGLE LLC, Mountain View, CA (US)

(72) Inventor: Chih-Hsiang Wu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 566 days.

(21) Appl. No.: 17/416,796

(22) PCT Filed: Jun. 3, 2020

(86) PCT No.: PCT/US2020/035849
§ 371 (c)(1),
(2) Date: Jun. 21, 2021

(87) PCT Pub. No.: WO2020/251815
PCT Pub. Date: Dec. 17, 2020

(65) Prior Publication Data
US 2022/0070788 A1    Mar. 3, 2022

Related U.S. Application Data

(60) Provisional application No. 62/871,289, filed on Jul. 8, 2019, provisional application No. 62/861,823, filed on Jun. 14, 2019.

(51) Int. Cl.
*H04W 52/02* (2009.01)
*H04W 48/02* (2009.01)
*H04W 88/06* (2009.01)

(52) U.S. Cl.
CPC ....... *H04W 52/0277* (2013.01); *H04W 48/02* (2013.01); *H04W 88/06* (2013.01)

(58) Field of Classification Search
None
See application file for complete search history.

(56) References Cited

U.S. PATENT DOCUMENTS

| | | |
|---|---|---|
| 9,295,095 B2 | 3/2016 | Rayavarapu |
| 10,278,108 B2 | 4/2019 | Shaw et al. |
| 10,462,793 B2 | 10/2019 | Kweon et al. |
| 10,512,010 B2 | 12/2019 | Agiwal et al. |

(Continued)

FOREIGN PATENT DOCUMENTS

| | | |
|---|---|---|
| CN | 103167589 A | 6/2013 |
| CN | 105430726 B | 5/2018 |

(Continued)

OTHER PUBLICATIONS

International Preliminary Report on Patentability mailed Dec. 23, 2021 for International Application No. PCT/US2020/035849, 8 pages.

(Continued)

*Primary Examiner* — Suhail Khan

(57) ABSTRACT

A user device (UE) capable of operating in dual-mode connectivity (DC) with a master node (MN) and a secondary node (SN) detects a low-power condition of a battery of the UE. In response, the user device prevents the UE from operating in DC with the SN, so that the UE and the MN are configured to operate in single connectivity.

18 Claims, 23 Drawing Sheets

(56) References Cited

U.S. PATENT DOCUMENTS

| | | |
|---|---|---|
| 2012/0322504 A1 | 12/2012 | Chou et al. |
| 2014/0133375 A1 | 5/2014 | McDiarmid et al. |
| 2016/0100360 A1 | 4/2016 | Liu et al. |
| 2017/0201366 A1 | 7/2017 | Chamorro et al. |
| 2017/0289906 A1 | 10/2017 | Tamura et al. |
| 2018/0139672 A1 | 5/2018 | Yang et al. |
| 2018/0295552 A1 | 10/2018 | Chakraborty et al. |
| 2019/0069205 A1 | 2/2019 | Lee et al. |
| 2019/0101970 A1* | 4/2019 | Ge .................. G06F 1/1698 |
| 2019/0166553 A1 | 5/2019 | Ryoo et al. |
| 2020/0053616 A1 | 2/2020 | Zhu et al. |
| 2020/0059935 A1 | 2/2020 | Qian et al. |
| 2020/0092844 A1 | 3/2020 | Lin et al. |
| 2021/0185753 A1* | 6/2021 | Mattam .................. H04W 76/30 |

FOREIGN PATENT DOCUMENTS

| | | |
|---|---|---|
| CN | 110149680 A | 8/2019 |
| CN | 110381536 A | 10/2019 |
| CN | 110753389 A | 2/2020 |
| EP | 2557859 A1 | 2/2013 |
| EP | 2605558 A1 | 6/2013 |
| EP | 2713656 A2 | 4/2014 |
| EP | 3136789 A1 | 3/2017 |
| EP | 3203783 A1 | 8/2017 |
| EP | 3448114 A1 | 2/2019 |
| EP | 3468292 A1 | 4/2019 |
| EP | 3557941 A1 | 10/2019 |
| KR | 20190067926 A | 6/2019 |
| WO | 2013123429 A2 | 8/2013 |
| WO | 2014186062 A1 | 11/2014 |
| WO | 2016005765 A1 | 1/2016 |
| WO | 2016032855 A1 | 3/2016 |
| WO | 2017088521 A1 | 6/2017 |
| WO | 2017190232 A1 | 11/2017 |
| WO | 2018174662 A1 | 9/2018 |
| WO | 2019088364 A1 | 5/2019 |
| WO | 2019095254 A1 | 5/2019 |
| WO | 2020091546 A1 | 5/2020 |
| WO | 2020223347 A1 | 11/2020 |
| WO | 2017202183 A1 | 11/2021 |

OTHER PUBLICATIONS

MIUI 11 Ultra Power Saving Mode on Any XiaomiDevice—Download Apk', by MIUI.net.in, Aug. 4, 2019, 10 pages.

GTI Sub-6GHz 5G Device White Paper', https://www.gtigroup.org/d/file/Resources/rep/2018-02-22/c9d31709d72643e625321d6f3724d761.pdf, CMCC et al., Jan. 1, 2018, 32 pages.

5G Implementation Guidelines: NSA Option 3', GSM Association, Mar. 28, 2019, 26 pages.

International Search Report and Written Opinion mailed Sep. 14, 2020 for corresponding International Application No. PCT/US2020/035849, 14 pages.

Communication pursuant to Article 94(3) EPC mailed May 8, 2023 for EP 20747216.8, 4 pages.

Invitation to Pay Additional Fees and Partial Search Report mailed Sep. 27, 2021 for International Application No. PCT/US2021/035517, 19 pages.

Wan, L. et al., "Enabling Efficient 5G NR and 4G LTE Coexistence," EEE Wireless Communications, Feb. 2019, 3 pages.

International Preliminary Report on Patentability mailed Dec. 15, 2022 for International Application No. PCT/US2021/035517, 30 pages.

International Search Report and Written Opinion mailed Jan. 21, 2022 for International Application No. PCT/US2021/035517, 39 pages.

Translation of Notification of First Office Action mailed Oct. 16, 2023 for CN Application No. 202080006701.X, 21 pages.

* cited by examiner

SAVING POWER IN A COMMUNICATION DEVICE

CROSS-REFERENCE TO RELATED APPLICATIONS

The present application is a U.S. National Stage under 35 U.S.C. § 371 of International Patent Application Serial No. PCT/US2020/035849, entitled "SAVING POWER IN A COMMUNICATION DEVICE" and filed on 3 Jun. 2020, which claims priority to U.S. Provisional Application No. 62/861,823, entitled "SAVING POWER IN A COMMUNICATION DEVICE" and filed on 14 Jun. 2019, and U.S. Provisional Application No. 62/871,289, entitled "SAVING POWER IN A COMMUNICATION DEVICE" and filed on 8 Jul. 2019, the entireties of which are incorporated by reference herein.

TECHNICAL FIELD

This disclosure relates generally to wireless communications and, more particularly, to using dual connectivity (DC) and single connectivity (SC) while a communication device battery experiences a low-power condition.

BACKGROUND

A user device (or user equipment, commonly denoted by acronym "UE") in some cases can operate in DC with a master node (MN) and a secondary node (SN). The MN and the SN are base stations that can operate according to the same radio access technology (RAT) or, in a multi-radio DC (MR-DC) configuration, different RATs. Two configurations in which the MN supports Evolved Universal Terrestrial Radio Access (EUTRA) and the SN supports 5G new radio (NR) are referred to as EN-DC and NGEN-DC, depending on the type of core network (CN). A configuration in which the MN supports NR and the SN supports EUTRA is referred to as NE-DC. In yet another configuration, NR-NR DC, both the MN and SN support NR. Various DC configurations are described in the 3rd Generation Partnership Project (3GPP) standard TS 37.340 v. 15.4.0, for example.

The MN can provide a control plane connection and a user plane connection to a CN, whereas the SN generally provides a user plane connection. The cells associated with the MN define a master cell group (MCG), and the cells associated with the SN define the secondary cell group (SCG). The UE and the base stations MN and SN can use signaling radio bearers (SRBs) to exchange radio resource control (RRC) messages, as well as non-access stratum (NAS) messages. There are several types of SRBs that a UE can use when operating in DC. SRB1 and SRB2 resources allow the UE and the MN to exchange RRC messages related to the MN, and to embed RRC messages related to the SN, and can be referred to as MCG SRBs. SRB3 resources allow the UE and the SN to exchange RRC messages related to the SN, and can be referred to as a SCG SRB. Split SRBs allow the UE to exchange RRC messages directly with the MN by using radio resources of the MN, the SN, or both of the MN and SN. Further, the UE and the base stations MN and SN use data radio bearers (DRBs) to transport data on a user plane. DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of both the MN and the SN can be referred to as split DRBs.

A UE operating in DC with an MN and an SN generally consumes more power than when operating in SC. Moreover, when the MN and the SN operate according to different RATs, the UE may need to operate two separate chipsets. When the battery level is low, DC operation can consume enough power to render the UE unable to make emergency calls, or shut down completely.

SUMMARY

According to the techniques of this disclosure, a UE detects a low-power condition of the battery (e.g., the remaining power level being below a threshold level) and prevents the UE from operating in DC with an MN and an SN. However, the UE can operate in SC with the MN, i.e., the base station that operates as an MN in DC scenarios. Because the UE does not connect with the SN, the UE reduces power consumption. After the UE determines that the low-power condition no longer applies (e.g., that the battery is receiving a charge from a power source), the UE enables DC operation with the MN and the SN.

In some implementations, the UE transmits an explicit indication to the MN (e.g., a UE capability information message) to notify the MN whether the UE has enabled or disabled DC. In some implementations, the UE includes a DC band combination, a DC support indicator, or a list of DC-supported bands in the radio access capability IE of the UE capability information message to indicate that the UE has enabled DC. To indicate that the UE has disabled DC, the UE excludes this information in the UE capability information message.

Alternatively, the UE can implicitly notify the MN regarding the current status of DC at the UE. In some implementations, the UE suspends measurement reports for a carrier frequency of the SN or suspends measurements entirely. In other implementations, the UE transmits "artificial" measurement reports that simulate to the MN low signal strength and/or low signal quality of the carrier frequency of the SN, regardless of whether the signal strength and/or the signal quality are in fact low. In this manner, the UE prevents the MN from configuring the UE to use the carrier frequency of the SN in DC.

When the UE uses different chips (e.g., modems) to communicate with the MN and SN using different respective RATs or using the same RAT, the UE can disable DC operation by turning off one of the chips that supports the RAT of the SN. In another implementation, the UE deactivates the chip that supports the RAT of the SN without turning off the chip, so as to stop monitoring one or more carrier frequencies of the SN. In this manner, the UE prevents itself from operating in DC with the SN while remaining capable of monitoring one or more carrier frequencies of the MN. The UE thus retains SC capability.

In addition to enabling or disabling DC operation, the UE in some implementations also enables or disables MN carrier aggregation (CA) in response to detecting the same low-power condition of the battery or another (e.g., more severe) low-power condition of the battery. In some implementations, the UE includes a MN CA band combination in the radio access capability IE of the UE capability information message to indicate that the UE has enabled CA. To indicate that the UE has disabled CA, the UE excludes this information in the UE capability information message. In some implementations, the UE disables DC when the power level of the battery reaches a certain threshold level and then disables CA when the power level of the battery reaches another, lower threshold level. In other implementations, the UE disables DC and CA when the power level of the battery reaches the same threshold level.

In some implementations, to avoid interruptions in data usage (e.g., dropping calls, lower data rate), the UE postpones disabling DC operation in view of the low-power condition of the battery, if the UE detects a predetermined operational condition (e.g., the UE is currently engaged in a voice or video call, a screen of the UE is on, a power-saving feature of the UE has been deactivated).

In an example scenario, a UE operating in EN-DC or NGEN-DC detects a low-power condition of a battery and disables DC operation in response. The UE transmits a UE capability information message indicating that the UE has disabled DC capability for an NR connection to the Master evolved Node B (MeNB) or the Master next generation eNB, (Mng-eNB), depending on the configuration. The UE uses a EUTRA SRB1 to transmit the UE capability information message to the base station.

Alternatively, instead of transmitting the UE capability information message to explicitly indicate that the UE has disabled DC capability, the UE may prevent the MeNB (or the Mng-eNB, in case of the NGEN-DC configuration) from acquiring measurements for a frequency carrier of the SgNB, thereby preventing an NR connection to the SgNB. The UE can prevent the MeNB or Mng-eNB from acquiring measurements for the frequency carrier of the SgNB by suspending measurement reports for a carrier frequency of the SN, suspending measurements entirely, or transmitting "artificial" measurement reports that simulate to the MeNB (or the Mng-eNB, in case of the NGEN-DC) low signal strength and/or low signal quality of the carrier frequency of the SgNB, regardless of whether the signal strength and/or the signal quality are in fact low.

In another example scenario, the UE operating in NE-DC or NR-NR DC detects a low-power condition of a battery of the UE and in response disables DC operation. The UE then transmits a UE capability information message (indicating that the UE has disabled DC capability) to the MgNB using an NR SRB1 or, alternatively, prevents the MgNB from acquiring measurement of a frequency carrier of the Sng-eNB or the SgNB.

In some implementations, the UE transmits an indication of SCG failure or MCG failure to the MN to prevent the MN from performing a procedure for recovering from the SCG failure or the MCG failure, respectively. By detecting SCG failure or MCG failure and suspending respective SCG transmission and MCG transmission, the UE effectively disables DC capability.

In some implementations, the UE transmits an "artificial" measurement report to the MN or SN so as to cause the MN or SN to initiate an SN release. The artificial measurement report simulates low signal strength and/or low signal quality of the carrier frequency of the SN, regardless of whether the signal strength and/or the signal quality are in fact low. By releasing the SN, the UE effectively disables DC capability.

An example embodiment of these techniques is a method in a UE capable of operating in DC with an MN and an SN, which the UE can execute using processing hardware. The method includes detecting a low-power condition of a battery of the UE. In response to detecting the low-power condition of the battery, the method prevents the UE from operating in DC with the SN, so that the UE and the MN are configured to operate in SC.

Another example embodiment of these techniques is a UE with processing hardware configured to implement the method above.

DETAILED DESCRIPTION OF THE DRAWINGS

Figure 1:
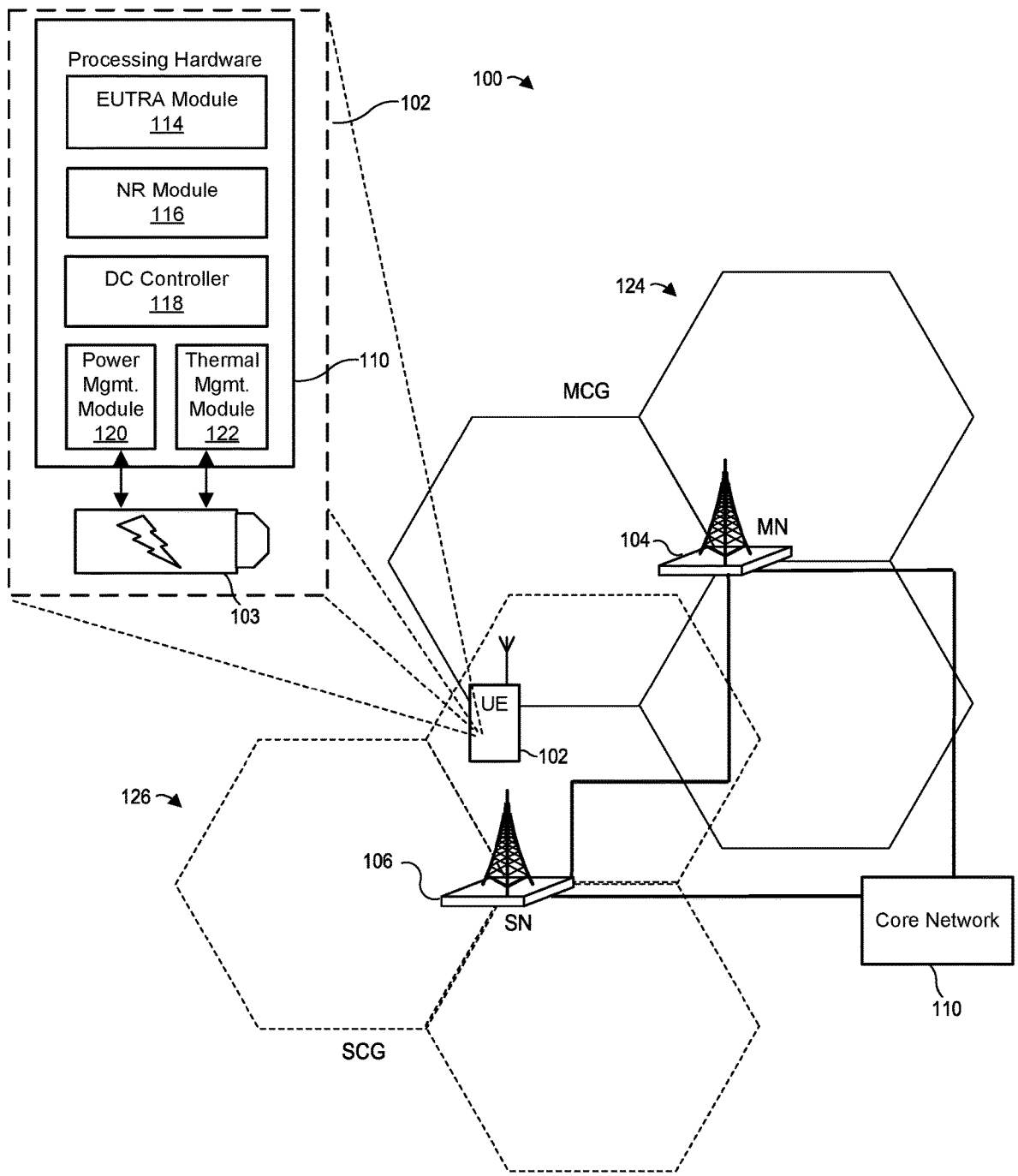
FIG. 1 is a block diagram of an example wireless communication network in which a UE, capable of operating in DC with an MN and an SN, determines whether to operate in DC in view of a low-power condition of a battery of the UE.

FIG. 1 depicts an example wireless communication network 100 in which a UE 102 equipped with a battery 103 is capable of operating in DC with an MN 104 and an SN 106, or in SC with the MN 104 or the SN 106. To utilize the power of the battery 103 more efficiently, the UE 102 (which can be any suitable device capable of wireless communications, as discussed below) implements the techniques below to disable DC capability under some conditions while continuing to use SC. As discussed in detail below, the UE 102 explicitly or implicitly indicates to the MN 104 that the UE 102 has disabled DC capability.

More particularly, the UE 102 is equipped with processing hardware 110 that can include one or more general-purpose processors such as central processing units (CPUs) and non-transitory computer-readable memory storing machine-readable instructions executable on the one or more general-purpose processors, and/or special-purpose processing units. The processing hardware 110 in an example implementation includes a EUTRA module 114 and an NR module 116. The EUTRA module 114 can be an RF chip, such as a modem, configured to modulate a carrier frequency of a EUTRA-capable base station to encode digital information for transmission, and demodulate the carrier frequency to decode transmitted information from the EUTRA-capable base station. Similarly, the NR module 116 can be a RF chip, such as a modem, configured to handle communications with a NR-capable base station. The UE 102 thus is capable of communicating with the MN 104 and SN 106 via different RATs such as EUTRA and NR, respectively.

In another implementation, the processing hardware 110 includes only the EUTRA module 114, both the MN 104 and the SN 106 are eNBs, and the UE 102 communicates with the MN 104 and the SN 106 via the same RAT, EUTRA. In yet another example implementation, the processing hardware 110 includes only the NR module 116, both the MN 104 and the SN 106 are gNBs, and the UE 102 communicates with the MN 104 and SN 106 via 5G NR. In another implementation, the MN 104 is a gNB and the SN 106 is a 6G base station that provides radio resources on a carrier frequency greater than 100 GHz or even in the THz range. More generally, each of the MN 104 and the SN 106 can operate according to any suitable RAT, and the UE 102 can include the corresponding single- or dual-RAT capability.

The processing hardware 110 further includes a DC controller 118 configured, in part, to determine when the UE 102 should operate in DC or only in SC. The DC controller 118 can make this determination in view of the status of the battery 103, in some cases, one or more other operational conditions such as whether the screen of the UE 102 (not shown to avoid clutter) currently is on, whether the UE 102 currently is in an audio or a video call, whether the user of the UE 102 has activated a power-saving feature, etc., and in some cases, temperature level(s) of the UE 102 or one or more components of the processing hardware 110.

The DC controller 118 can receive an indication of the current status of the battery 103 from a power management module 120. The indication can be for example a periodic report that indicates the current power level of the battery 103 (e.g., 90%, 55%, 8%), a real-time indication that the power level has reached a certain threshold value, or any other suitable value or a set of values. The power management module 120 can operate as a component of the operating system (OS) of the UE 102 or as a firmware component, for example. Further, the power management module 120 in some implementations determines the initial capacity of the battery 103, the rate at which the power level of the battery 103 changes, the rate at which the UE 102 currently is consuming power, the overall capacity of the battery 103, and/or other metrics using of which the DC controller 118 can determine whether the UE 102 should operate in DC or limit the UE 102 to SC.

In some implementations, the processing hardware 110 includes a thermal management module 122 configured to determine the temperature of one or more of the various components of the processing hardware 110 discussed above. The thermal management module 122 can include a temperature sensor of any suitable type. The DC controller 118 can receive an indication of the temperature of the UE 102 from thermal management module 122. The indication can be for example a periodic report that indicates the current temperature level of the battery 103, NR EUTRA module 114, NR module 116, and/or DC controller 118, (e.g., 90° F., 96° F., 75° F., 26° C.), a real-time indication that the temperature level has reached a certain threshold value, or any other suitable value or a set of values.

Further, in some scenarios, the power management module 120 determines that the UE 102 is connected to a power source, such as an alternating current (AC) source charger or a direct current (DC) source external battery, "power bank" portable charger, or wireless charger. The power management module 120 in one example implementation determines that the low-power condition does not apply even if the current power level of the battery 103 is below a certain threshold value. In other words, the power management module 120 in this case determines that the power source will likely restore the power level of the battery 103 in the near future.

In operation, the DC controller 118 can detect a low-power condition of the battery 103 using one or more reports from the power management module 120. For example, the DC controller 118 can detect a low-power condition of the battery 103 by comparing the remaining power level with a certain threshold level stored in memory of the UE 102. The threshold level can correspond to a certain remaining battery capacity (e.g., percentage or value of battery charge or capacity remaining, e.g., 10%).

As discussed in more detail below, the DC controller 118 can disable DC capability in response to detecting a low-power condition of the battery 103. However, disabling DC capability may prevent the UE 102 from operating in DC with the SN 106, so that the UE 102 and the MN 104 can operate in SC. The DC controller 118 can generate and transmit an indication to the MN 104, or alternatively prevent the MN 104 from acquiring measurement of the frequency carrier of the SN 106, such as by suspending measurement reports for a carrier frequency of the SN 106, suspending measurements entirely, or transmitting "artificial" measurement reports that simulate to the MN 104 low signal strength and/or low signal quality of the carrier frequency of the SN 106, regardless of whether the signal strength and/or the signal quality are in fact low. In some implementations, the UE 102 can disable either the EUTRA module 114 or NR module 116 entirely or disable the frequency measuring functionality of the module without disabling the module entirely.

The UE 102 is capable of operating with the MN 104 that covers an MCG 124 made up of one or more cells, and the SN 106 that covers an SCG 126 made up of one or more cells. In some scenarios discussed below, the UE can detect SCG failure or MCG failure and, in response to detecting SCG failure or MCG failure, transmits an indication of SCG failure or MCG failure to the MN 104.

In different configurations of the network 100, the MN 104 can be implemented as a master eNB (MeNB) or a master gNB (MgNB) node, the SN 106 104 can be implemented as a secondary eNB (SeNB) or a secondary gNB (SgNB) node, and the UE 102 communicates with the MN 104 and SN 106 via the same RAT such as EUTRA or NR, or different RATs such as EUTRA and NR. In some cases, the MeNB or SeNB is implemented as an ng-eNB rather than an eNB. The MN 104 and the SN 106 can connect to a core network 110. For example, the core network (CN) 110 can be a 5G core network (5GC) or an evolved packet core (EPC). Some of these example configurations are discussed in more detail below.

Next, several example methods and scenarios corresponding to different DC configurations and/or different UE implementations are discussed with reference to FIGS. 2-17. Each of the methods discussed below can be implemented using hardware, software, firmware, or any suitable combination of hardware, software, and firmware.

Figure 2:
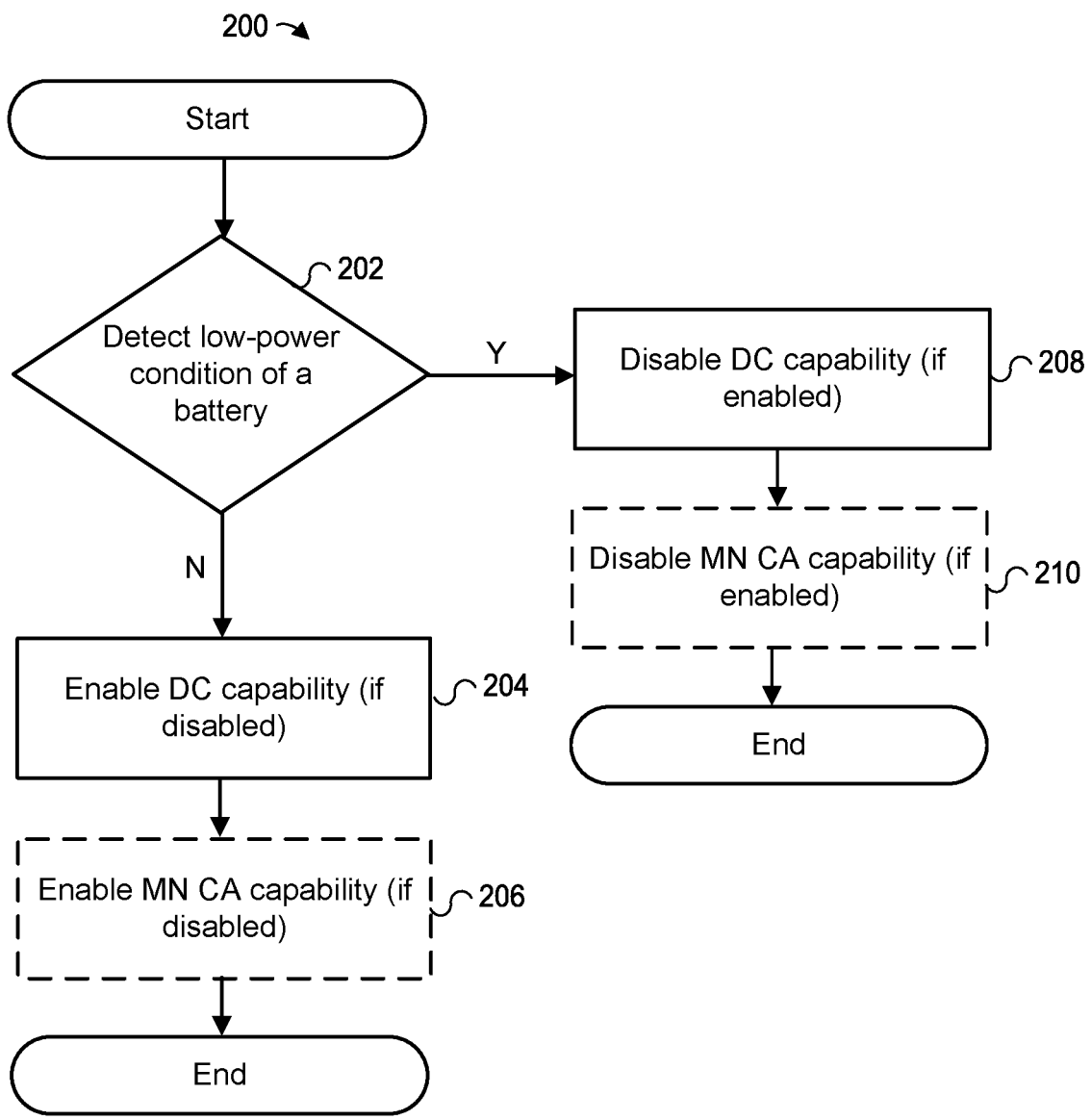
FIG. 2 is a flow diagram of an example method for determining whether a UE should disable DC capability and (optionally) CA capability in view of a low-power condition of a battery, which can be implemented in the UE of FIG. 1.

FIG. 2 depicts an example method 200 for determining whether the UE 102 should disable DC capability and (optionally) CA capability in view of a low-power condition of a battery.

The method 200 begins at block 202, where the UE 102 determines whether a low-power condition of the battery 103 has occurred. For example, the DC controller 118 can process one or more reports from the power management 120 to determine whether the remaining amount of power of the battery 103 is above a certain level, whether the rate at which the UE 102 is consuming power is above a certain level, etc. (see the discussion above). If the UE 102 does not detect a low-power condition, the UE 102 at block 204 enables DC capability when DC capability previously is disabled. In another scenario, the UE 102 keeps DC capability enabled, when DC capability is already enabled. However, if the UE 102 detects a low-power condition, the UE 102 at block 208 disables DC capability, if DC capability previously is enabled. In another scenario, when DC capability is already disabled, the UE 102 keeps DC capability disabled.

In some implementations, in addition to enabling or disabling DC capability, the UE 102 enables or disables MN CA capability in view of the low-power condition of the battery 103. In particular, if the UE 102 does not detect a low-power condition, the UE 102 at block 206 enables MN CA capability, if MN CA capability previously is disabled. In another scenario, the UE 102 keeps MN CA capability enabled, if MN CA capability is already enabled. Thus, according to the method 200, when the battery 103 has sufficient power, the UE 102 uses MN CA to transmit and receive data at higher rates. However, if the UE 102 detects a low-power condition, the UE 102 at block 210 disables MN CA capability, if MN CA capability previously is enabled. If MN CA capability is already disabled, the UE 102 keeps MN CA capability disabled.

Although the method 200 as illustrated in FIG. 2 completes after block 206 or block 210, in general the UE 102 can execute the method 200 in an iterative manner, e.g., by "looping back" to block 202 after executing block 206 or block 210.

Figure 3:
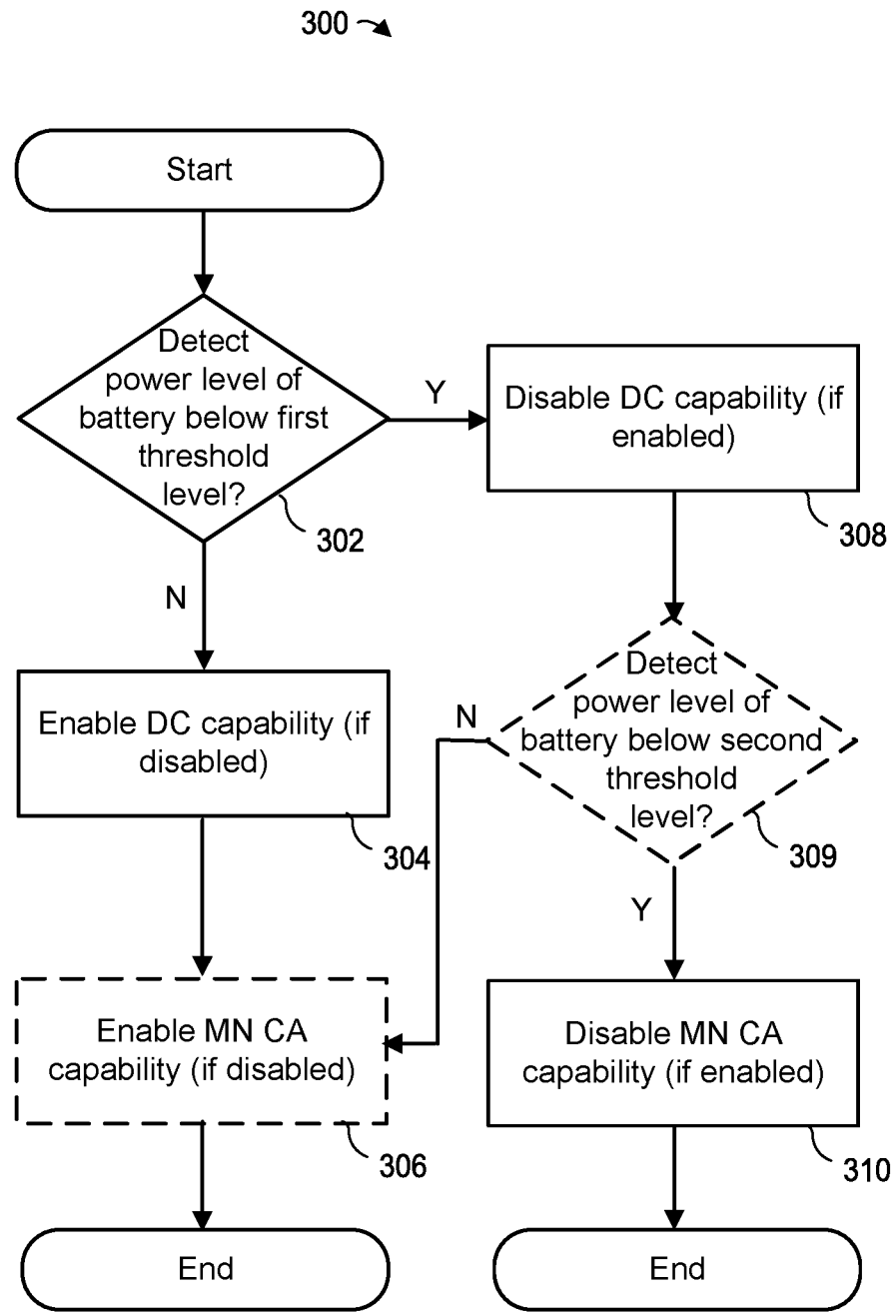
FIG. 3 is a flow diagram of an example method for determining whether a UE should disable DC capability in view of one low-power condition of a battery, and whether the UE should disable CA capability in view of another low-power condition of the battery, which can be implemented in the UE of FIG. 1.

FIG. 3 depicts an example method 300 for determining whether the UE 102 should disable DC capability in view of one low-power condition of the battery, and whether the UE should disable CA capability in view of another low-power condition of the battery.

The method 300 begins at block 302, where the UE 102 determines whether a low-power condition of the battery 103 (e.g., the remaining power level is below a first threshold level) has occurred, similar to block 202 of FIG. 2. If the UE 102 does not detect a low-power condition, the UE 102 at block 304 enables DC capability when DC capability previously is disabled. In another scenario, the UE 102 keeps DC capability enabled, when DC capability is already enabled. However, if the UE 102 detects a low-power condition, the UE 102 at block 308 disables DC capability, if DC capability previously is enabled. In another scenario, when DC capability is already disabled, the UE 102 keeps DC capability disabled.

In some implementations, in addition to enabling or disabling DC capability, the UE 102 enables MN CA capability in view of the same low-power condition, but disables MN CA capability in view of a different low-power condition (e.g., the remaining power level is below a second threshold level that is lower than the first threshold level). In particular, if the UE 102 does not detect the same low-power condition, the UE 102 at block 306 enables MN CA capability, if MN CA capability previously is disabled. In another scenario, the UE 102 keeps MN CA capability enabled, if MN CA capability is already enabled. However, if the UE 102 at block 309 detects a different low-power condition, the UE 102 at block 310 disables MN CA capability, if MN CA capability is already enabled. In another scenario, the UE 102 keeps MN CA capability disabled, if MN CA capability previously is disabled. If the UE 102 at block 309 does not detect a different low-power condition, the UE 102 at block 306 enables MN CA capability, if MN CA capability previously is disabled. In another scenario, the UE 102 keeps MN CA capability enabled, if MN CA capability is already enabled.

Although the method 300 as illustrated in FIG. 3 completes after block 306 or block 310, in general the UE 102 can execute the method 300 in an iterative manner, e.g., by "looping back" to block 302 or block 309, respectively, after executing block 306 or 310.

Figure 4:
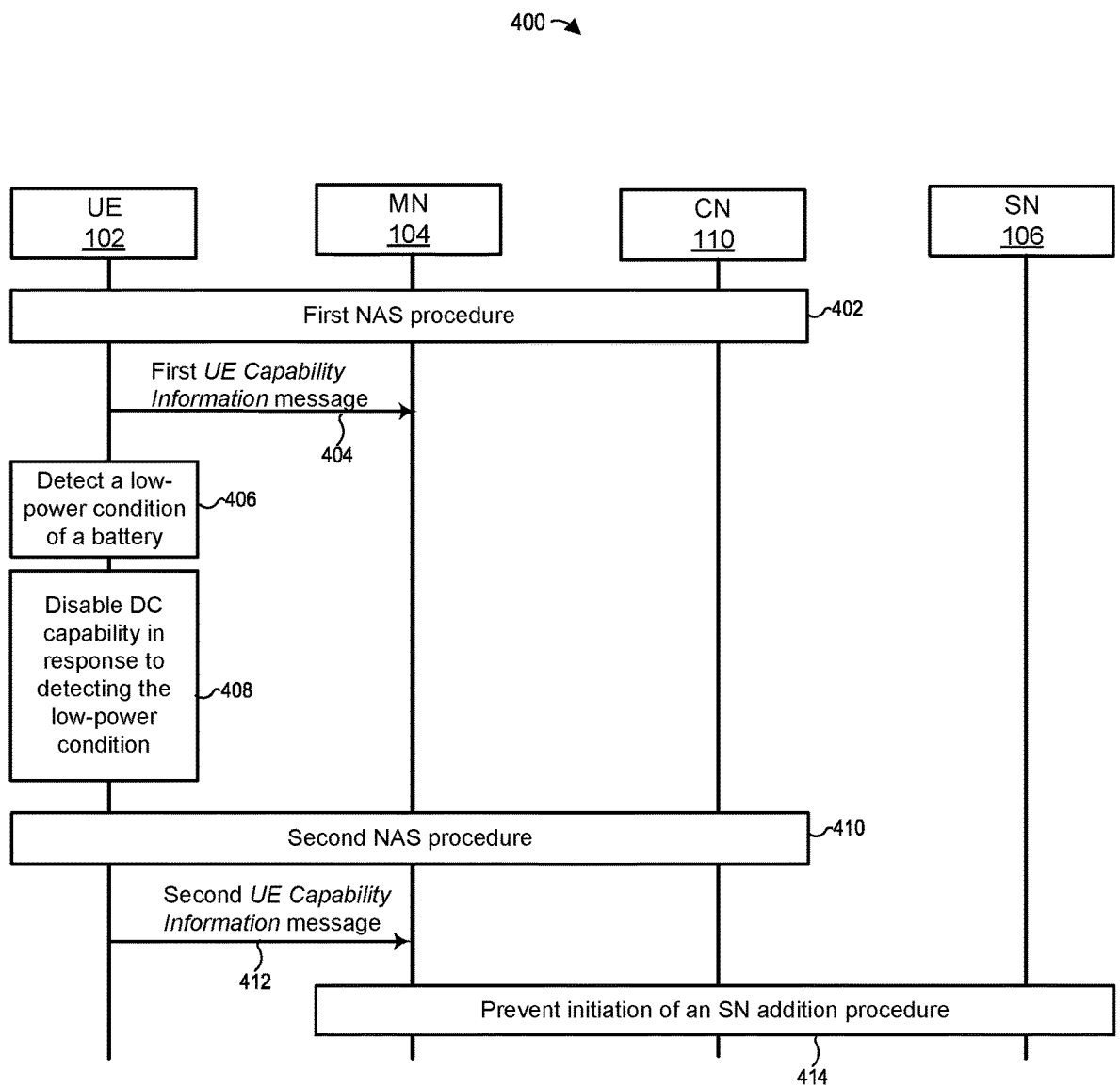
FIG. 4 is a messaging diagram of an example scenario in which a UE prevents an MN from initiating an SN addition procedure, using an explicit indication that the UE has disabled DC capability.

FIG. 4 depicts an example messaging diagram 400 of an example scenario in which the UE 102 prevents the MN 104 from initiating an SN addition procedure using an explicit indication that the UE 102 has disabled DC capability.

At the beginning of this scenario, the UE 102 performs 402 a first NAS procedure with the CN 110 via the MN 104. If the UE is operating in EN-DC and therefore in communication with the CN 110 implemented as an EPC, the first NAS procedure may be a first Attach procedure or a first Tracking Area Update procedure defined in 3GPP TS 24.301, for example.

To begin the first Attach procedure, the UE 102 sends an Attach Request message to a mobility management entity (MME) of the CN 110 and receives an Attach Accept message from the MME in response. The UE 102 then sends an Attach Complete message to the MME. As another example, to begin the first Tracking Area Update procedure, the UE 102 sends a Tracking Area Update Request message to the MME and receives a Tracking Area Update Accept message from the MME in response. The UE 102 then sends a Tracking Area Update Complete message to the MME in response to the Tracking Area Update Accept message.

If the UE 102 is operating in NGEN-DC, NR-NR DC, or NE-DC, and accordingly in communication with the CN 110 implemented as a 5GC, the first NAS procedure may be a Registration procedure defined in 3GPP TS 24.501. To begin the first Registration procedure, the UE 102 sends a Registration Request message to an access and mobility management function (AMF) of the CN 110 and receives a Registration Accept message from the AMF in response. The UE 102 then sends a Registration Complete message to the AMF.

In the scenario of FIG. 4, the UE 102 generates an explicit indication (e.g., a first UE capability information message) to notify 404 the MN 104 that the UE 102 supports DC capability. The MN 104 may transmit the indication to the CN 110. In some implementations, the UE 102 transmits 404 this indication during the first NAS procedure. In other implementations, the UE 102 transmits 404 this indication after completing the first NAS procedure.

In some implementations, the UE 102 indicates that the UE 102 is capable of DC in a NAS message (e.g., the Attach Request message, Attach Complete message, Registration Request message, or Registration Complete message) of the first NAS procedure. The CN 110 (e.g., the MME or the AMF) then may indicate to the MN 104 that the UE 102 is capable of DC.

As a more particular example, when generating the first UE capability information message, the UE 102 generates one or more radio access capability information elements (IEs) (e.g., a UE-EUTRA-Capability IE, a UE-MRDC-Capability IE and/or a UE-NR-Capability IE) (hereinafter referred as the radio access capability IE(s)) and includes at least one DC band combination in the radio access capability IE(s) of the first UE capability information message to indicate that the UE 102 has enabled DC, in one implementation.

In another implementation, the UE 102 includes a DC support indicator and/or a list of DC-supported bands in the radio access capability IE(s) of the first UE capability information message to indicate that the UE 102 has enabled DC. The UE 102 in some implementations can include the DC band combination and the DC support indicator and/or a list of DC-supported bands in the same radio access capability IE (i.e., a first radio access capability IE).

One of the radio access capability IE(s) can be a UE-EUTRA-Capability IE or a UE-NR-Capability IE. For example, the radio access capability IE is a UE-EUTRA-Capability IE if the MN 104 is an E-UTRA base station (e.g., eNB or ng-eNB). To indicate to the MN 104 that the UE 102 supports EN-DC capability, the DC support indicator may be an EN-DC support indicator (e.g., en-DC-r15), and the DC supported band list may be a supportedBandListEN-DCNR-r15. To indicate to the MN 104 that the UE 102 supports NGEN-DC capability, the UE 102 can reuse the DC support indicator and the DC supported band list for EN-DC. Alternatively, the DC support indicator may be a specific NGEN-DC support indicator (e.g., ng-en-DC-r15), and the DC supported band list may be specific for NR in NGEN-DC (e.g., a supportedBandListNGEN-DCNR-v1560).

As another example, one of the radio access capability IE(s) is a UE-NR-Capability IE if the MN 104 is an 5G NR base station implemented as a gNB. To indicate to the MN 104 that the UE 102 supports NE-DC capability, the DC support indicator may be a specific NE-DC support indicator (e.g., ne-DC), and the DC supported band list may be specific for EUTRA in NE-DC (e.g., a supportedBandListNE-DCEUTRA). Alternatively, the DC supported band list may be generic for EUTRA (e.g., supportedBandListEUTRA) irrespective of the DC configuration. To indicate to the MN 104 that the UE 102 supports NR-NR DC capability, the DC support indicator may be a specific NR-DC support indicator (e.g., nr-DC), and the DC supported band list may be specific for NR in NR-DC (e.g., a supportedBandListNR-DC-v1560 or a supportedBandCombinationList). Alternatively, the DC supported band list may be generic for NR (e.g., supportedBandListNR) irrespective of the DC configuration.

In some cases, a UE 102 can implement a combination of the techniques discussed above. For example, the UE 102 can include a DC band combination in a first radio access capability IE of the first UE capability information message, and additionally include a DC support indicator and/or a DC supported band list in a different radio access capability IE than the first radio access capability IE (i.e., a second radio access capability IE) of the first UE capability information message to indicate that the UE 102 has enabled DC. In another example, the UE 102 can include a DC support indicator and/or a DC supported band list in a first radio access capability IE of the first UE capability information message to indicate that the UE 102 has enabled DC, and additionally include a DC band combination in a second radio access capability IE of a different UE capability information message than the first UE capability information message (i.e., a third UE capability information message). The UE 102 transmits the first UE capability information message or the third UE capability information message to the MN 104 during or after the first NAS procedure.

Upon receiving the explicit indication, such as the first UE capability information message and/or the third UE capability information message (if transmitted), the MN 104 configures (when necessary) the UE 102 with resources to exchange EUTRA RRC messages or user plane data (when operating in EN-DC or NGEN-DC, for example) or exchange NR RRC messages or user plane data (when operating in NE-DC or NR-NR DC, for example) with the MN 104. The MN 104 also configures the UE 102 to communicate with the SN 106. Accordingly, the UE 102 is capable of communicating in DC with the MN 104 and the SN 106.

After the MN 104 configures the UE 102 for DC operation, the UE 102 detects 406 a low-power condition of the battery 103, similar to block 202 and block 308 in FIG. 2 and FIG. 3, respectively. In response, the UE 102 disables 408 DC capability, similar to block 208 and block 308 in FIG. 2 and FIG. 3, respectively.

By disabling DC capability, the UE 102 prevents the UE from operating in DC with the SN 106, so that the UE 102 and the MN 104 can operate only in SC.

To notify the MN 104 that the UE 102 has disabled DC capability, the UE 102 performs 410 a second NAS procedure with the CN 110 via the MN 104. The second NAS procedure is similar to the first NAS procedure described above, in that if the UE is operating in EN-DC and therefore in communication with the CN 110 implemented as an EPC, the second NAS procedure can be the Attach procedure or the Tracking Area Update procedure.

If the UE 102 is operating in NGEN-DC, NR-NR DC, or NE-DC, the second NAS procedure may be the Registration procedure.

During or after the second NAS procedure, for example, the UE 102 generates an explicit indication (e.g., a second UE capability information message) to notify 412 the MN 104 that the UE 102 will no longer be using DC. The MN 102 may transmit the indication to the CN 110. In some implementations, the UE 102 transmits 412 this indication during the second NAS procedure. In other implementations, the UE 102 transmits 412 this indication after completing the second NAS procedure.

In some implementations, the UE 102 indicates that the UE 102 will no longer be using DC in a NAS message (e.g., the Attach Request message, Attach Complete message, Registration Request message or Registration Complete message) of the second NAS procedure. The CN 110 (e.g., the MME or the AMF discussed above) then may indicate to the MN 104 that the UE 102 will no longer be using DC.

For example, when generating the second UE capability information message, the UE 102 generates a first radio access capability IE of the radio access capability IE(s) (e.g., a UE-EUTRA-Capability IE, a UE-MRDC-Capability IE and/or a UE-NR-Capability IE) and excludes the DC band combination in the first radio access capability IE of the second UE capability information message to indicate that the UE 102 has disabled DC. Alternatively, the UE 102 excludes the first radio access capability IE in the second UE capability information message at all.

In other implementations, the UE 102 excludes a DC support indicator or a list of DC-supported bands in a second radio access capability IE of the radio access capability IE(s) of the second UE capability information message to indicate that the UE 102 has disabled DC. Alternatively, the UE 102 excludes the second radio access capability IE in the second UE capability information message at all.

In yet other implementations, the UE 102 excludes the DC band combination in the first radio access capability IE of the second UE capability information message, nor does the UE 102 include a DC support indicator or a DC-supported band list in the second radio access capability IE, to indicate that the UE 102 has disabled DC. Alternatively, the UE 102 excludes the first radio access capability IE nor the second radio access capability IE in the second UE capability information message at all.

In some cases, the UE 102 may transmit the first and second radio access capability IEs in different UE capability information messages to the MN 104 as opposed to the same UE capability information message (i.e., the second UE capability information message). For example, the UE 102 excludes a DC support indicator or a DC-supported band list in the second radio access capability IE in the second UE capability information message nor does the UE 102 include the DC band combination in the first radio access capability IE of a fourth UE capability information message, to indicate that the UE 102 has disabled DC. Alternatively, the UE 102 excludes the first radio access capability IE nor the second radio access capability IE in the different UE capability information messages at all.

Upon receiving the explicit indication, the MN 104 prevents 414 initiation of an SN addition procedure with the SN 106, while continuing to support SC between the UE 102 and the MN 104. For example, the MN 104 does not configure the UE 102 with resources to communicate with the SN 106 but configures (when necessary) the UE 102 with resources to exchange EUTRA RRC messages and user plane data (when the MN 104 is an eNB or a ng-eNB, for example) or NR RRC messages and user plane data (when the MN 104 is a gNB, for example) with the MN 104. Accordingly, the UE 102 is capable of communicating with only the MN 104 (i.e., and not the SN 106).

The UE 102 also can enable MN CA during or after the first NAS procedure. To notify the MN 104 that the UE 102 enabled MN CA, the UE 102 includes at least one MN CA band combination in the first radio access capability IE or the second radio access capability IE of the first UE capability information message.

The UE 102 can disable MN CA during or after the second NAS procedure. To notify the MN 104 that the UE 102 disabled MN CA capability, the UE 102 excludes at least one MN CA band combination in the first radio access capability IE or the second radio access capability IE of the second UE capability information message and/or the fourth UE capability information message (if transmitted). Alternatively, the UE 102 excludes the first and second radio access capability IEs in the second UE capability information message and/or the fourth UE capability information message (if transmitted) at all.

In some implementations, the UE 102 transmits 404 the first UE capability information message in response to a first UE Capability Enquiry message received from the MN 104. The UE 102 can receive the first UE Capability Enquiry message during or after the first NAS procedure. The MN 104 can transmit the first UE Capability Enquiry message to the UE 102 after receiving an indication from the CN 110 that the UE 102 is capable of DC. The UE 102 transmits the third UE capability information message to the MN 104 in response to a third UE Capability Enquiry message received from the MN 104. The UE 102 can receive the third UE Capability Enquiry message during or after the first NAS procedure. The MN 104 can transmit the third UE Capability Enquiry message to the UE 102 after receiving an indication from the CN 110 that the UE 102 is capable of DC.

Similarly, the UE 102 can transmit the second UE capability information message to the MN 104 in response to a second UE Capability Enquiry message received from the MN 104 during or after the second NAS procedure, for example. The MN 104 can transmit the second UE Capability Enquiry message to the UE 102 after receiving an indication from the CN 110 that the UE 102 will no longer be using DC. The UE 102 can transmit the fourth UE capability information message to the MN 104 in response to a fourth UE Capability Enquiry message received from the MN 104 during or after the second NAS procedure, for example. The MN 104 can transmit the fourth UE Capability Enquiry message to the UE 102 after receiving an indication from the CN 110 that the UE 102 will no longer be using DC. The first, second, third, and fourth UE Capability Enquiry messages and the first, second, third, and fourth UE capability information messages in these examples are RRC messages, but in general the UE 102 and the MN 104 can use any suitable messages to query and report UE capabilities.

After the UE 102 disables the DC capability, a user may charge or replace the battery 103, so that the low-power condition of the battery 103 no longer applies (e.g., the battery 103 can receive a charge from a power source). The DC controller 118 can determine that the remaining power level is at or above the same threshold level that previously caused the DC controller 118 to disable DC capability, or at a different threshold level (i.e., a second threshold level stored in memory of the UE 102). In any case, the DC controller 118 at some point can determine that the UE 102 can again operate in DC. In this case, the DC controller 118 can again perform 402 the first NAS procedure to re-enable DC capability and (optionally) re-enable MN CA capability.

In some implementations, the UE 102 may perform a NAS detach procedure or a NAS deregistration procedure and then the second NAS procedure, to disable the DC capability. The UE 102 may perform a NAS detach procedure or a NAS deregistration procedure and then the first NAS procedure, to re-enable the DC capability. In other implementations, the UE 102 does not perform the NAS detach procedure nor the NAS deregistration procedure to disable or re-enable the DC capability.

Figure 5:
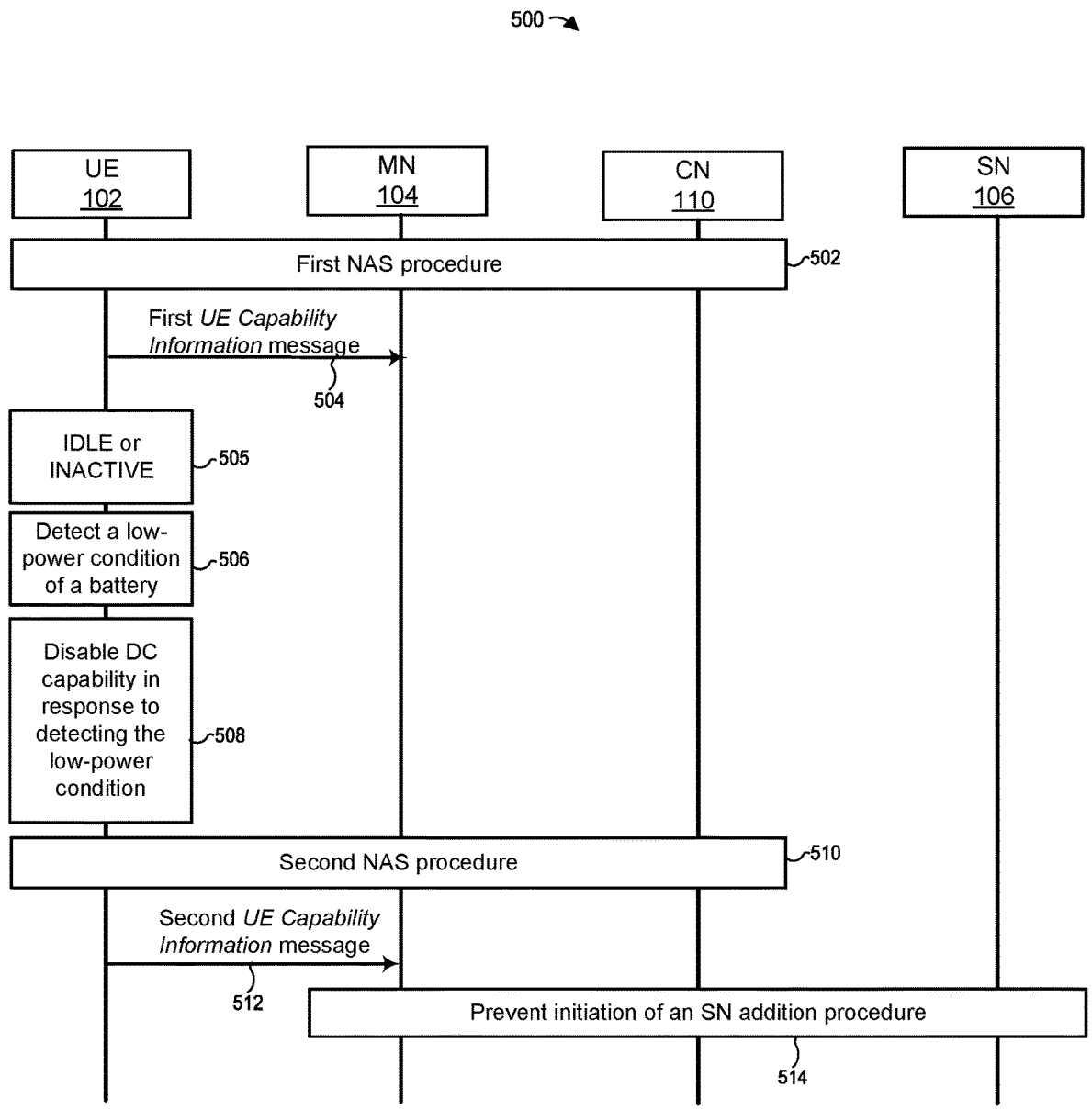
FIG. 5 is a messaging diagram of an example scenario in which a UE, operating in an idle or inactive state of the RRC protocol, disables DC capability in response to detecting a low-power condition of the battery.
Figure 6:
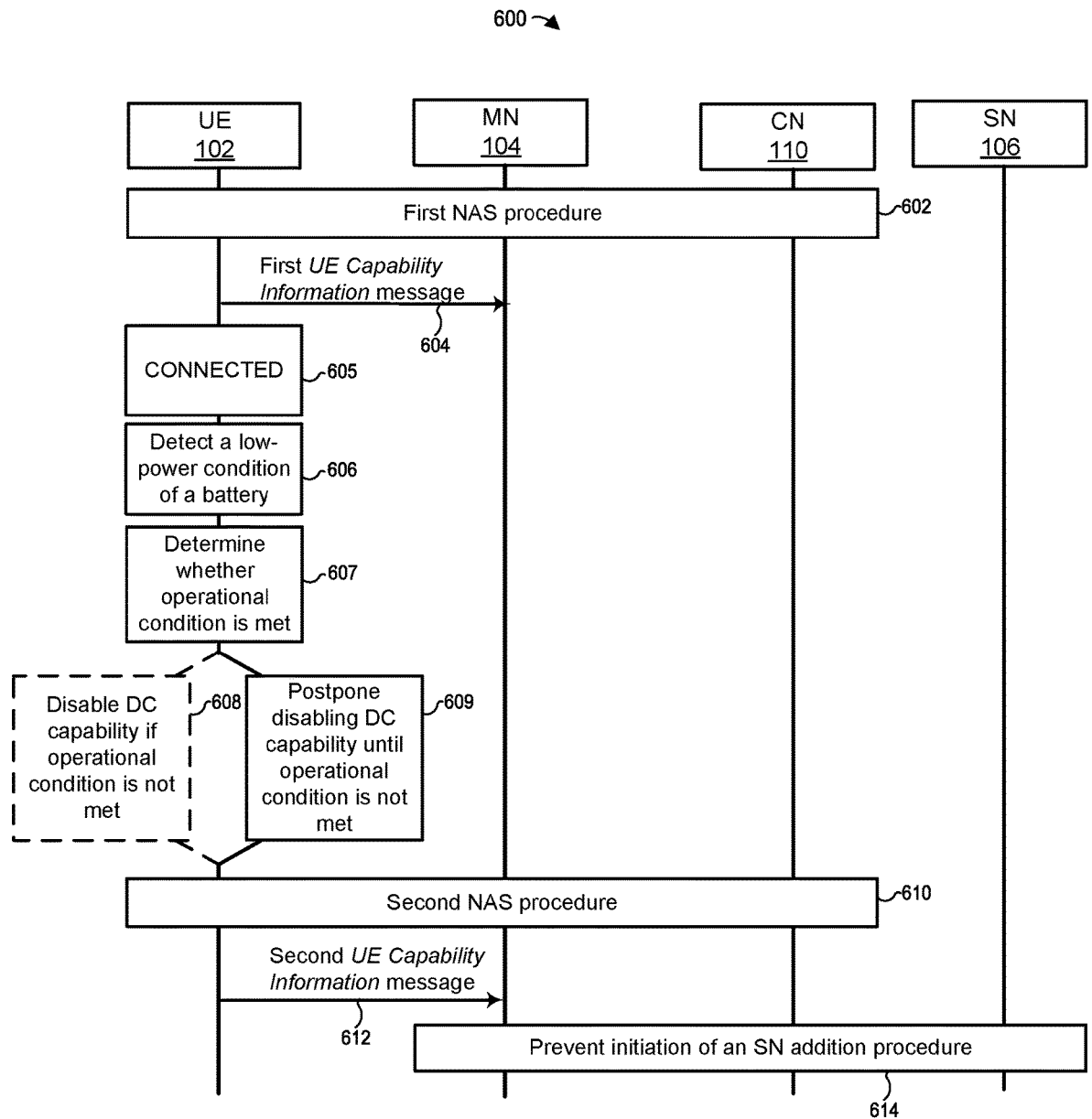
FIG. 6 is a messaging diagram of an example scenario in which a UE, operating in a connected state of the RRC protocol, postpones the disabling of DC capability after detecting a low-power condition of the battery.

Further, the UE 102 in some implementations can postpone disabling DC operation in view of the current RRC state (e.g., idle, connected, inactive) of the UE 102. To avoid dropping calls or otherwise disrupting ongoing data sessions when the UE 102 is in a connected state, the UE 102 can postpone disabling DC operation in view of the connected state (e.g., EUTRA-RRC_CONNECTED when the MN is an eNB or an ng-eNB, NR-RRC CONNECTED when the MN is a gNB). As illustrated in FIGS. 5-6, the UE 102 can consider such RRC states and/or other conditions to determine the timing of disabling DC.

Referring first to FIG. 5, the UE 102, operating in an idle or inactive state of the RRC protocol, disables DC capability in response to detecting a low-power condition of the battery. The UE 102 at the beginning of this scenario performs 502 a first NAS procedure with the CN 110 via the MN 104, similar to event 402 in the scenario of FIG. 4. Also similar to the event 404 of FIG. 4, the UE 102 during or after the first NAS procedure generates an explicit indication that the UE 102 supports DC capability, and transmits 504 the indication to the MN 104. Upon receiving the explicit indication, the MN 104 configures the UE 102 with the requisite resources to communicate with the MN 104 as well as the SN 106 in DC.

After the MN 104 configures the UE 102 for DC operation, the UE 102 operates 505 in an idle state (e.g., EUTRA-RRC_IDLE, NR-RRC IDLE) or an inactive state (e.g., EUTRA-RRC INACTIVE, NR-RRC INACTIVE). In some cases, the MN 104 configures the UE 102 to enter the idle or inactive state if there is no data activity between the MN 104, the SN 106 and the UE 102. The UE 102 then detects 506 a low-power condition of the battery 103, similar to event 406 in the scenario of FIG. 4.

In response, the UE 102 disables 508 DC capability, similar to event 408, except that the UE 102 in this scenario disables DC capability in view of the idle state or the inactive state as well as the low-power condition of the battery 103. By disabling DC capability, the UE 102 prevents the UE from operating in DC with the SN 106, so that the UE 102 and the MN 104 can operate only in SC.

Although the UE 102 in the example scenario of FIG. 5 operates 505 in the idle state or the inactive state before detecting 506 the low-power condition, in other implementations, the UE 102 can detect 506 the low-power condition before operating 505 in the idle state or the inactive state. In any event, because the user of the UE 102 may not experience interruptions in data usage when the UE 102 is in idle state or inactive state, the UE 102 need not postpone disabling the DC capability.

To notify the MN 104 that the UE 102 has disabled DC capability, the UE 102 performs 510 a second NAS procedure with the CN 110 via the MN 104, similar to event 410. Events 512 and 514 also are similar to events 412 and 414 discussed above.

After the UE 102 disables the DC capability, the DC controller 118 can determine that the remaining power level is at or above the same threshold level that previously caused the DC controller 118 to disable DC capability, or at a different threshold level. In any case, the DC controller 118 at some point can determine that the UE 102 can again operate in DC. In response, the UE 102 can perform 402 the first NAS procedure to re-enable the DC capability and (optionally) re-enable MN CA capability (if disabled) as described above if the UE 102 is in idle state or inactive state. If the UE 102 is in connected state, the UE 102 can postpone the first NAS procedure until the UE 102 is in idle state or inactive state. In some implementations, the UE 102 may need to perform a NAS detach procedure or a NAS deregistration procedure to disable or re-enable the DC capability. The UE 102 performs the NAS detach procedure or the NAS deregistration procedure if the UE 102 is in idle state or inactive state. If the UE 102 is in connected state, the UE 102 can postpone the NAS detach procedure or the NAS deregistration procedure until the UE 102 is in idle state or inactive state. In other words, the UE 102 can postpone the disabling or re-enabling of the DC capability and (optionally) the MN CA capability until the UE 102 is in idle state or inactive state.

Some exemplary implementations described for the scenario of FIG. 4 can be applied to the scenario of FIG. 5.

In contrast to the scenario of FIG. 5, the UE 102 in the scenario 600 of FIG. 6 initially operates in a connected state of the RRC protocol and accordingly postpones the disabling of DC capability after detecting a low-power condition of the battery.

The UE 102 first performs 602 a first NAS procedure with the CN 110 via the MN 104, similar to the event 502 in the scenario of FIG. 5. During or after the first NAS procedure, the UE 102 generates an explicit indication to notify the MN 104 that the UE 102 supports DC capability, and transmits 604 the indication to the MN 104, similar to the event 504 in the scenario of FIG. 5.

Upon receiving the explicit indication, the MN 104 configures (when necessary) the UE 102 with requisite resources to communicate with the MN 104 as well as with the SN 106 in DC.

After the MN 104 configures the UE 102 for DC operation, the UE 102 operates 605 in a connected state (e.g., EUTRA-RRC_CONNECTED, NR-RRC CONNECTED).

The UE 102 then detects 606 a low-power condition of the battery 103, similar to event 506 in the scenario of FIG. 5, except that the UE 102 detects the low-power condition in view of the connected state.

In response, the UE 102 determines 607 whether a predetermined operational condition is met. If a predetermined operational condition is not met (e.g., the UE 102 is not engaged in a voice or video call, a screen of the UE 102 is off, or a power-saving feature of the UE 102 has been activated), the UE 102 disables 608 DC capability, similar to event 508 in the scenario of FIG. 5, except that the UE 102 disables DC capability in view of the connected state and not detecting a predetermined operational condition. However, if a predetermined operational condition is met (e.g., the UE 102 is engaged in a voice or video call, a screen of the UE 102 is on, or a power-saving feature of the UE 102 has been deactivated), the UE 102 postpones 609 disabling of the DC capability until the operational condition no longer applies. Although the UE 102 in the example scenario of FIG. 6 operates 605 in a connected state before detecting 606 the low-power condition, in other implementations, the UE 102 can detect 606 the low-power condition before operating 605 in the connected state.

To notify the MN 104 that the UE 102 has disabled DC capability, the UE 102 performs 610 a second NAS procedure with the CN 110 via the MN 104, similar to event 510 in the scenario of FIG. 5. Events 612 and 614 also are similar to events 512 and 514 discussed above.

After the UE 102 disables DC, the DC controller 118 can determine that the remaining power level is at or above the same threshold level that previously caused the DC controller 118 to disable DC capability, or at a different threshold level. In any case, the DC controller 118 at some point can determine that the UE 102 can again operate in DC. In response, the UE 102 can perform 602 the first NAS procedure to re-enable the DC capability and (optionally) re-enable MN CA capability (if disabled) as described above if the predetermined operational condition is not met. If the predetermined operational condition is met, the UE 102 postpones re-enabling of the DC capability and (optionally) MN CA capability (if disabled) until the predetermined operational condition no longer applies. In some implementations, the UE 102 may need to perform a NAS detach procedure or a NAS deregistration procedure to disable or re-enable the DC capability. The UE 102 performs the NAS detach procedure or the NAS deregistration procedure if the predetermined operational condition is not met. If the predetermined operational condition is met, the UE 102 can postpone the NAS detach procedure or the NAS deregistration procedure. In other words, the UE 102 can postpone the disabling or re-enabling of the DC capability and (optionally) the MN CA capability until the predetermined operational condition is not met.

Some exemplary implementations described for the scenarios of FIGS. 4 and 5 can be applied to the scenario of FIG. 6.

Next, FIGS. 7-10 depict methods of determining whether a UE should disable DC capability and (optionally) CA capability in response to detecting a predetermined operational condition and a low-power condition.

Figure 7:
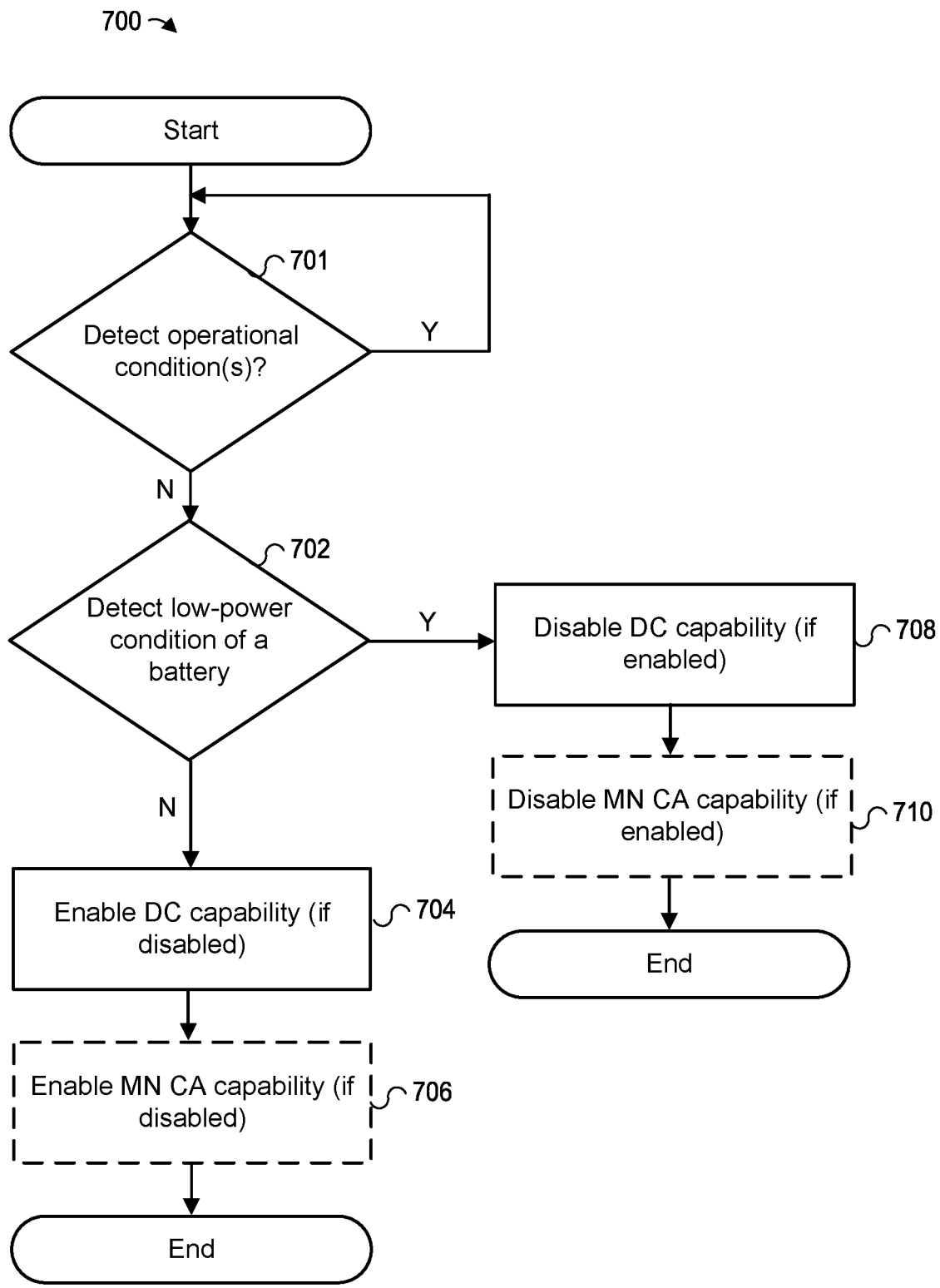
FIG. 7 is a flow diagram of an example method for determining whether a UE should disable DC capability and (optionally) CA capability in response to detecting a predetermined operational condition prior to detecting a low-power condition of the battery, which can be implemented in the UE of FIG. 1.

FIG. 7 depicts an example flow diagram 700 of an example method for determining whether the UE 102 should disable DC capability and (optionally) CA capability in response to detecting a predetermined operational condition prior to detecting a low-power condition of the battery.

The method 700 begins at block 701, where the UE 102 determines whether a predetermined operational condition is met. If the UE 102 determines that a predetermined operational condition is met, the UE 102 continues (e.g., aperiodically, periodically) to determine whether a predetermined operational condition is not met. If the UE 102 determines that a predetermined operational condition is not met, the UE 102 at block 702 determines whether a low-power condition of the battery 103 has occurred, similar to block 202 in the scenario of FIG. 2. The operational condition detected at block 701 may be one operational condition (e.g., the screen is on) or may include a combination of more than one operational condition (e.g., the screen is on and a power-saving feature of the UE 102 has been activated). Blocks 704, 706, 708, and 710 are similar to blocks 204, 206, 208, and 210 discussed above. Accordingly, if a predetermined operational condition is met, the UE 102 postpones disabling of the DC capability until the operational condition no longer applies.

Figure 8:
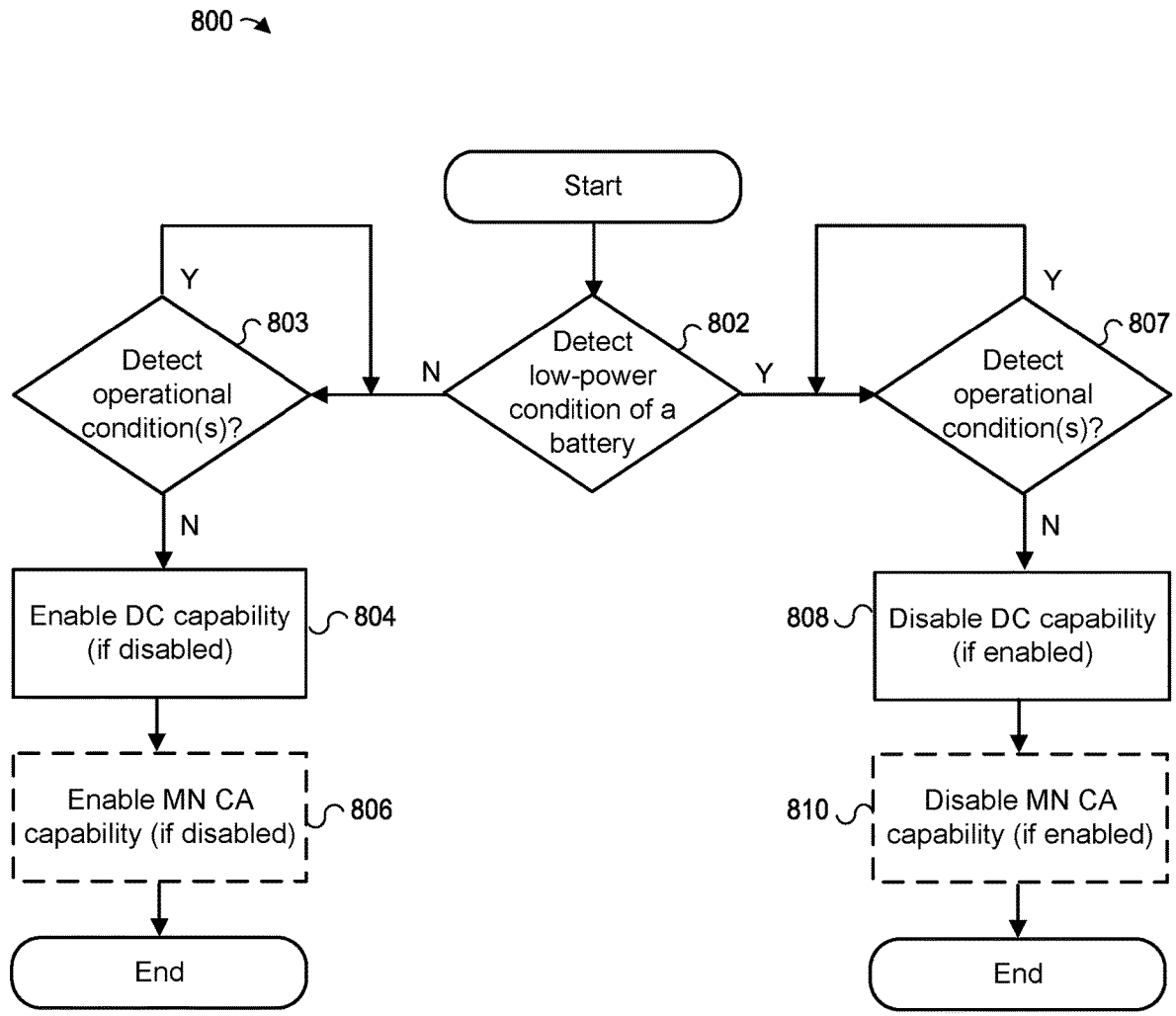
FIG. 8 is a flow diagram of an example method for determining whether the UE should disable DC capability and (optionally) CA capability in response to detecting a low-power condition of the battery prior to detecting a predetermined operational condition, which can be implemented in the UE of FIG. 1.

FIG. 8 depicts an example flow diagram 800 of an example method in which the UE 102 determines whether the UE 102 should disable DC capability and (optionally) CA capability in view of detecting a low-power condition of the battery prior to detecting an operational condition.

The method 800 begins at block 802, where the UE 102 determines whether a low-power condition of the battery 103 has occurred.

If the UE 102 does not detect a low-power condition, the UE 102 at block 803 determines whether a predetermined operational condition is met. If the UE 102 determines that a predetermined operational condition is met, the UE 102 continues to determine whether a predetermined operational condition is not met. If the UE 102 determines that a predetermined operational condition is not met, the UE 102 at block 804 enables DC capability when DC capability previously is disabled, similar to block 704 of FIG. 7. Block 806 is also similar to block 706 discussed above.

However, if the UE 102 detects a low-power condition at block 802, the UE 102 at block 807 determines whether a predetermined operational condition is met. If the UE 102 determines that a predetermined operational condition is met, the UE 102 continues to determine whether a predetermined operational condition is not met. If the UE 102 determines that a predetermined operational condition is not met, the UE 102 at block 808 disables DC capability when DC capability previously is enabled, similar to block 708 of FIG. 7. Block 810 is also similar to block 710 discussed above. The operational condition detected at blocks 803 and 807 may be the same or different operational conditions or may include a combination of more than one operational condition. For example, an operational condition that causes the UE 102 to postpone the enabling of the DC capability is a voice call (e.g., to prevent dropped calls), whereas an operational condition that causes the UE 102 to postpone the disabling of the DC capability is a more data intensive activity, such as a video call.

Figure 9:
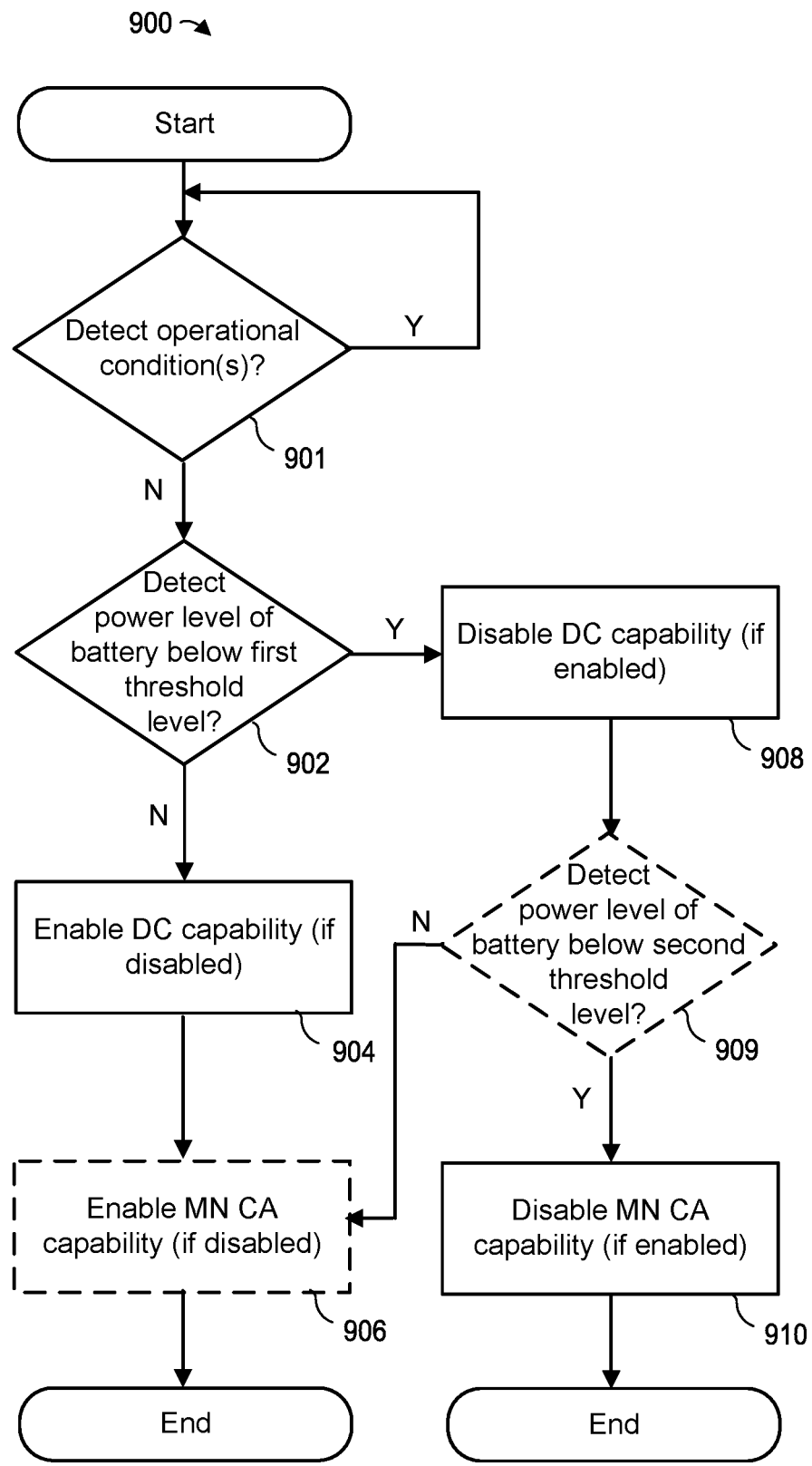
FIG. 9 is a flow diagram of another example method for determining whether a UE should disable DC capability and (optionally) CA capability in response to detecting a predetermined operational condition prior to detecting a low-power condition of the battery, which can be implemented in the UE of FIG. 1.

FIG. 9 depicts an example flow diagram 900 of another example method for determining whether the UE 102 should disable DC capability and (optionally) CA capability in response to detecting a predetermined operational condition prior to detecting a low-power condition of the battery.

The method 900 begins at block 901, where the UE 102 determines whether a predetermined operational condition is met, similar to block 701 of FIG. 7. If the UE 102 determines that a predetermined operational condition is met, the UE 102 continues to determine whether a predetermined operational condition is not met. If the UE 102 determines that a predetermined operational condition is not met, the UE 102 at block 902 determines whether a low-power condition of the battery 103 has occurred (e.g., by comparing the remaining power level with a certain threshold level), similar to block 302 of FIG. 3.

If the UE 102 does not detect a low-power condition, the UE 102 at block 904 enables DC capability when DC capability previously is disabled, similar to block 704 of FIG. 7. Block 906 is also similar to block 706 discussed above.

However, if the UE 102 detects a low-power condition, the UE 102 at block 908 disables DC capability, if DC capability previously is enabled, similar to block 708 of FIG. 7.

In some implementations, in addition to disabling DC capability, the UE 102 enables MN CA capability in view of the same low-power condition of block 902, but disables MN CA capability in view of a different low-power condition (e.g., the remaining power level is below a second threshold level that is lower than the first threshold level). In particular, if the UE 102 does not detect the same low-power condition, the UE 102 at block 906 enables MN CA capability, if MN CA capability previously is disabled, similar to block 706 discussed above. If the UE 102 at block 909 detects a different low-power condition, the UE 102 at block 910 disables MN CA capability, similar to block 710 discussed above.

Figure 10:
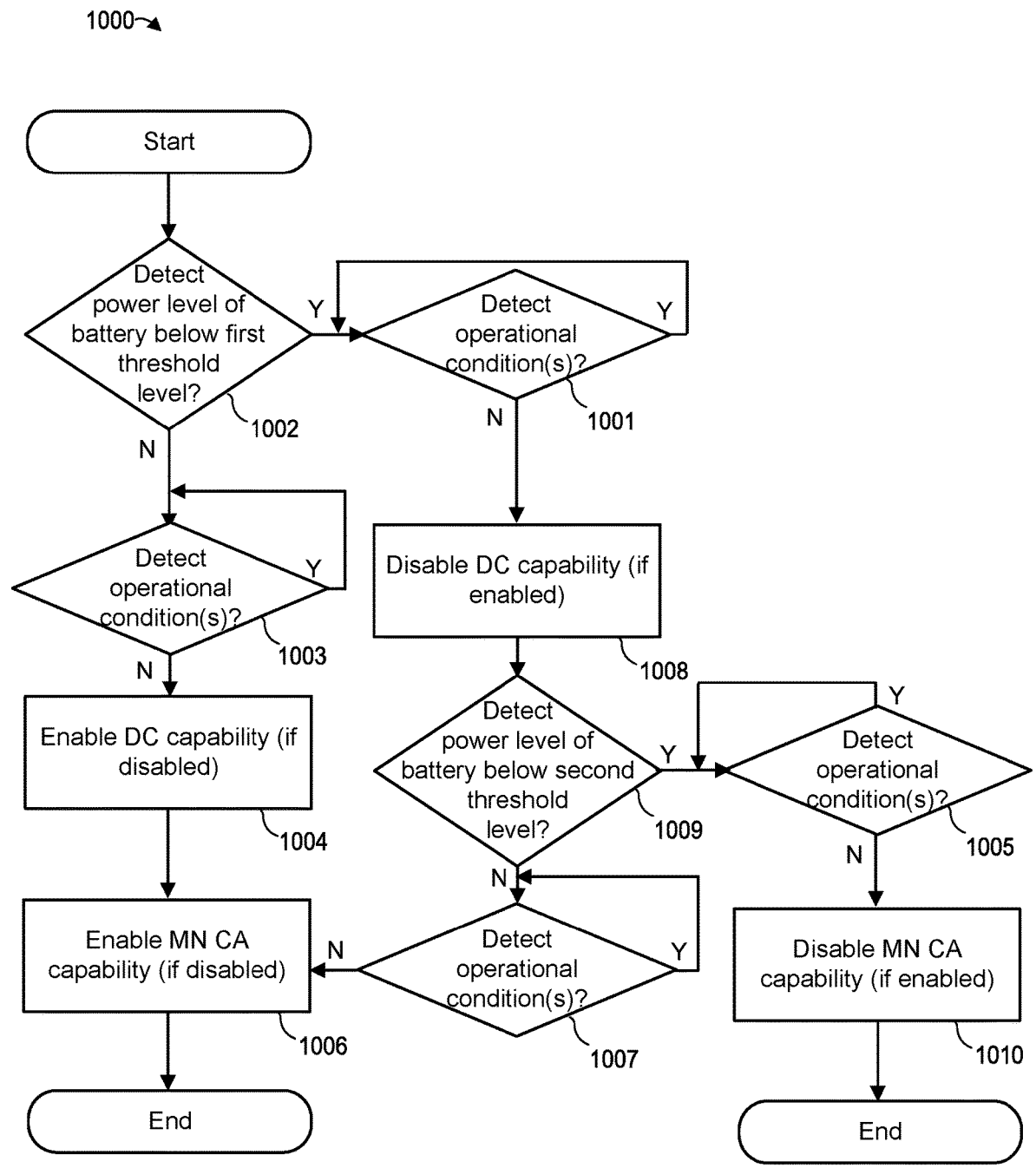
FIG. 10 is a flow diagram of an example method for determining whether a UE should disable DC capability in response to detecting a low-power condition of the battery prior to detecting a predetermined operational condition, and whether the UE should disable CA capability in view of detecting another low-power condition of the battery prior to detecting the predetermined operational condition, which can be implemented in the UE of FIG. 1.

FIG. 10 depicts an example flow diagram 1000 for determining whether the UE 102 should disable DC capability in response detecting a low-power condition of the battery prior to detecting a predetermined operational condition, and whether the UE 102 should disable CA capability in view of detecting another low-power condition of the battery prior to detecting the predetermined operational condition.

The method 1000 begins at block 1002, where the UE 102 determines whether a low-power condition of the battery 103 has occurred (e.g., by comparing the remaining power level with a certain threshold level), similar to block 902 of FIG. 9.

If the UE 102 does not detect a low-power condition, the UE 102 at block 1003 determines whether a predetermined operational condition is met, similar to block 803 of FIG. 8. The operational condition detected at block 1003 may be the same or different operational condition as the operational condition detected at block 803. Blocks 1004 and 1006 also are similar to blocks 804 and 806 discussed above.

However, if the UE 102 detects a low-power condition at block 1002, the UE 102 at block 1001 determines whether a predetermined operational condition is met, similar to block 807 of FIG. 8. The operational condition detected at block 1001 may be the same or different operational condition as the operational condition detected at block 807. Block 1008 also is similar to block 808 discussed above. The operational condition detected at blocks 1003 and 1001 may be the same or different operational conditions or may include a combination of more than one operational condition.

In some implementations, in addition to disabling DC capability, if the UE 102 at block 1009 does not detect a different low-power condition (e.g., the remaining power level is below a second threshold level that is lower than the first threshold level), the UE 102 at block 1007 determines whether a predetermined operational condition is met. If the UE 102 determines that a predetermined operational condition is met, the UE 102 continues to determine whether a predetermined operational condition is not met. If the UE 102 determines that a predetermined operational condition is not met, the UE 102 at block 1006 enables MN CA capability when MN CA capability previously is disabled, similar to block 806 discussed above.

However, if the UE 102 detects a different low-power condition at block 1009, the UE 102 at block 1005 determines whether a predetermined operational condition is met. If the UE 102 determines that a predetermined operational condition is met, the UE 102 continues to determine whether a predetermined operational condition is not met. If the UE 102 determines that a predetermined operational condition is not met, the UE 102 at block 1010 disables MN CA capability when MN CA capability previously is enabled, similar to block 810 discussed above. The operational condition detected at blocks 1007 and 1005 may be the same or different operational conditions or may include a combination of more than one operational condition with respect to the each other as well, as with respect to the operational condition detected at blocks 1003 and 1001.

Figure 11:
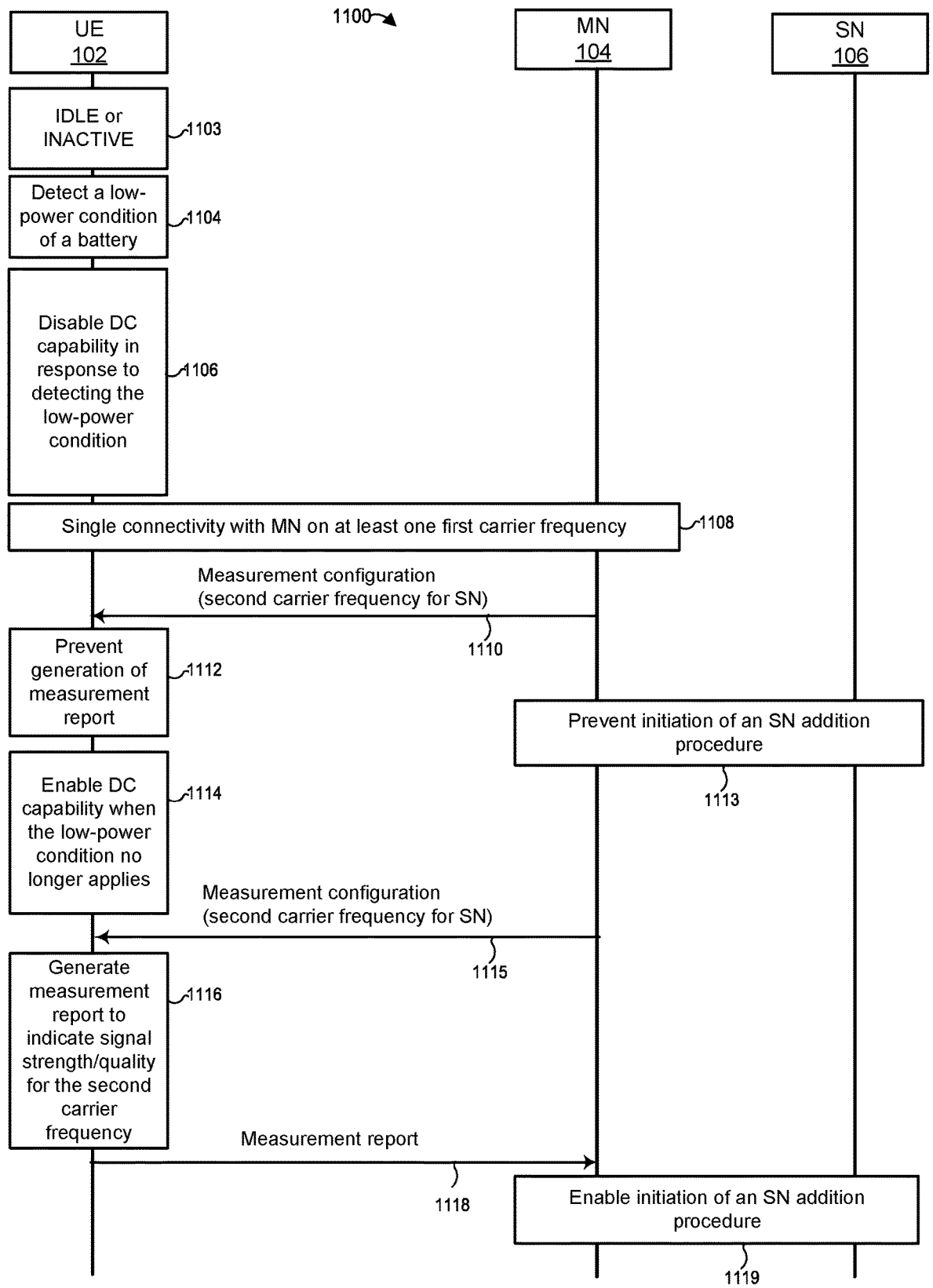
FIG. 11 is a messaging diagram of an example scenario in which a UE, operating in an idle or inactive state of the RRC protocol, prevents an MN from initiating an SN addition procedure by not providing a measurement report pertaining to the SN, in response to the UE detecting a low-power condition of the battery.
Figure 12:
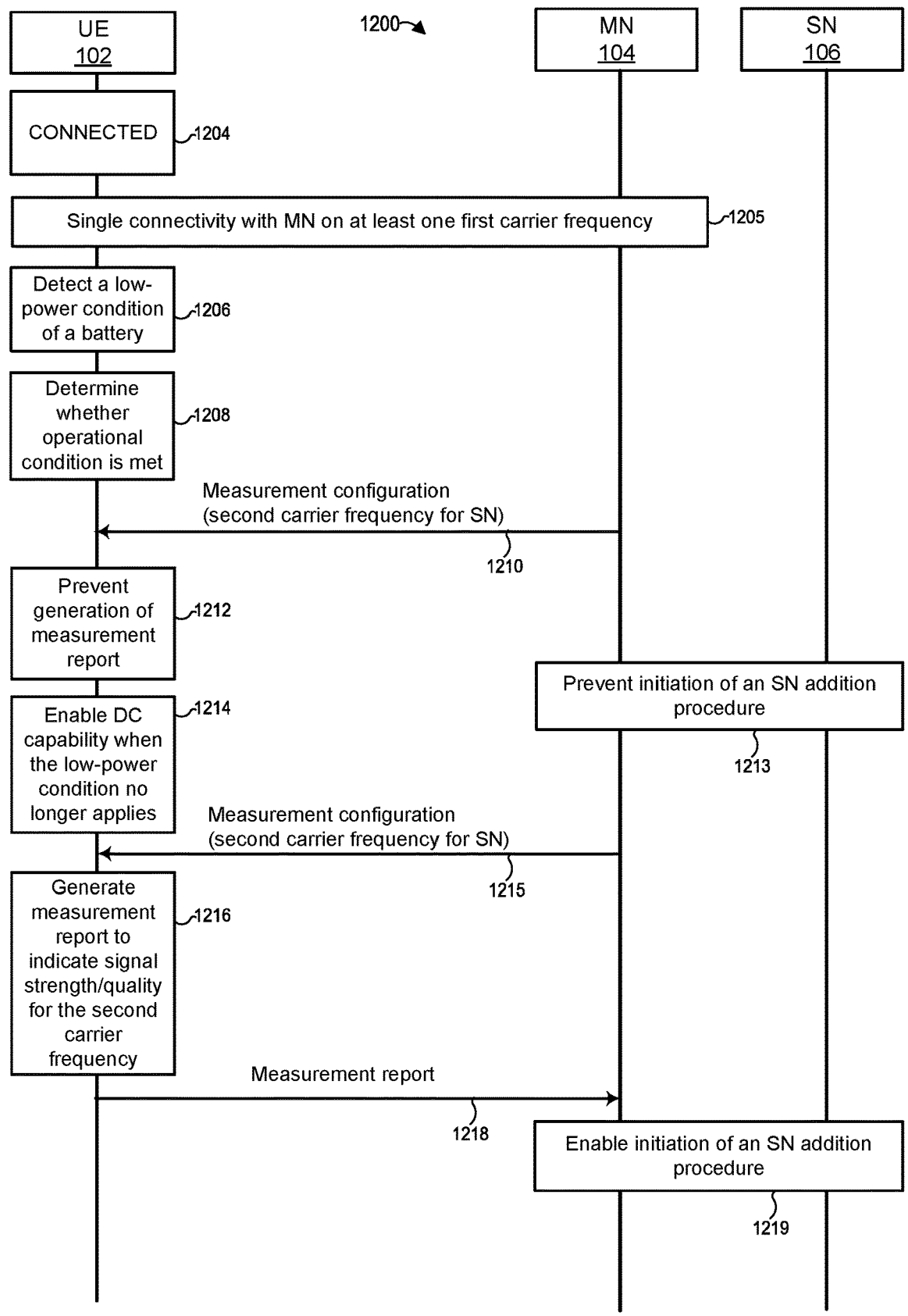
FIG. 12 is a messaging diagram of an example scenario in which a UE, operating in a connected state of the RRC protocol, prevents an MN from initiating an SN addition procedure, by not providing a measurement report pertaining to the SN.

FIGS. 11-12 depict scenarios in which the UE 102 prevents the MN 104 from initiating an SN addition procedure by not providing a measurement report pertaining to the SN 106, in contrast to FIGS. 2-3, which describe scenarios in which the UE 102 prevents the MN 104 from initiating an SN addition procedure by providing an explicit indication.

FIG. 11 depicts a messaging diagram 1100 for preventing, by the UE 102, an MN 104 from initiating an SN addition procedure by not providing a measurement report pertaining to the SN 106, in response to the UE 102 detecting a low-power condition of the battery.

At the beginning of this scenario, the UE 102 operates 1103 in an idle state or an inactive state, similar to event 505 in the scenario of FIG. 5. Events 1104 and 1106 also are similar to events 506 and 508 discussed above. Accordingly, the UE 102 operates 1108 in SC with the MN 104 on a carrier frequency of the MN 104.

The UE 102 can notify the MN 104 that the UE 102 has disabled DC capability to prevent the MN 104 from configuring the UE 102 to connect to the SN 106. In some implementations, the UE 102 implicitly notifies 1112 the MN 104 by not generating measurement reports of the carrier frequency of the SN 106 (or by not measuring a carrier frequency of the SN 106 at all). The measurement reports may cause the MN 104 to configure the UE 102 to connect the SN 106 in DC. The UE 102 may still be able to measure a carrier frequency of the SN 106 if the UE 102 disables the DC capability. Alternatively, the UE 102 may disable measuring a carrier frequency of the SN 106 if the UE 102 disables the DC capability. Further, in some implementations, the UE 102 implicitly notifies 1112 the MN 104 in response to the MN 104 transmitting 1110 a measurement configuration in an RRC message for the carrier frequency of the SN 106 to the UE 102 if the UE 102 disables the DC capability. Accordingly, the UE 102 prevents 1113 the MN 104 from initiating an SN addition procedure with the SN 106, while continuing to support SC between the UE 102 and the MN 104.

Exemplary implementations of the UE 102 are described below for the UE 102 disabling the DC capability. In one implementation, when the MN 104 transmits 1110 a measurement configuration for the carrier frequency of the SN 106 to the UE 102, the UE 102 generates and transmits "artificial" measurement reports that simulate to the MN 104 low signal strength and/or low signal quality of the carrier frequency of the SN 106, regardless of whether the signal strength and/or the signal quality are in fact low. In another implementation, the UE 102 transmits an explicit indication to the MN 104 to notify the MN 104 that the UE 102 supports DC capability as described with respect to FIGS. 4-6, but the UE 102 does not generate measurement results nor transmit "artificial" reports, described above. In this manner, regardless of implementation, the UE 102 prevents the MN 104 from configuring the UE 102 to use the carrier frequency of the SN 106 in DC. More specifically, the UE 102 does not inform the MN 104 of the carrier frequency measurements of the SN 106. Alternatively, the UE 102 informs the MN 104 or of a low signal strength and/or low signal quality of the carrier frequency of the SN 106 when in actuality the quality of the carrier frequency of the SN 106 may be high enough to configure the UE 102 to use the carrier frequency of the SN 106 in DC.

Implicitly notifying the MN 104 that the UE 102 has disabled DC capability may also prevent scenarios in which the UE 102 transmits SN measurement results to the MN 104, causing the MN 104 to configure the UE 102 to be DC (i.e., to connect the SN 106) after the UE 102 transitions from idle state or inactive state to a connected state while low-power condition of the battery 103 remains. The MN 104 may transmit a measurement configuration configuring the UE 102 to measure a carrier frequency of the SN 106 in an RRC message when the UE is in the connected state. Without implicitly notifying the MN 104 by the UE 102, the MN 104 configures the UE 102 to be in DC with the SN 106, despite the low-power condition.

When the UE 102 detects that the low-power condition no longer applies, the UE 102 enables 1114 DC capability. To notify the MN 104 that the UE 102 enabled DC capability, the UE 102 measures a carrier frequency of the SN 106, generates 116 a measurement report message, and transmits 1118 the measurement report message to the MN 104. To this end, the UE 102 may use SRB1 to transmit the measurement report message to the MN 104 if the measurement report message is to be transmitted to the MN 104 or to the SN 106 via the MN 104. Alternatively, the UE 102 may use SRB3 to transmit the measurement report message to the SN 106 if the measurement report message is to be transmitted to the SN 106.

Exemplary implementations of the UE 102 are described below for the UE 102 enabling the DC capability. In some implementations, the UE 102 transmits 1118 the measurement report message to the MN 104 in response to the MN 104 transmitting 1110 or 1115 a measurement configuration (e.g., MeasConfig) in an RRC message for the carrier frequency of the SN 106 to the UE 102. The measurement configuration can include a carrier frequency configuration configuring the carrier frequency of the SN 106 to be measured. The MN 104 can include the measurement configuration in an RRC message or in a system information block (SIB). The MN 104 transmits the RRC message to the UE 102 via an SRB or broadcasts the SIB to the UE 102. In one particular implementation, if the MN 104 is an E-UTRA base station (e.g., eNB or ng-eNB) and the SN 106 is a 5G NR base station (e.g., gNB), the carrier frequency configuration is a 5G NR carrier frequency configuration (e.g., CarrierFreqListNR-r15), the SIB can be a SystemInformationBlockType24, and the RRC message can be an RRCConnectionReconfiguration message, an RRCConnectionResume message, an RRCConnectionRelease message, or a new RRC message configuring the UE 102 to perform measurements in idle or inactive state. In response, the UE 102 measures a 5G NR carrier frequency configured in the 5G NR carrier frequency configuration, and reports the measurement results in the measurement report message back to the MN 104.

In another implementation, if both the MN 104 and the SN 106 are 5G NR base stations (e.g., gNBs), the measurement configuration is a MeasConfig, the SIB is an existing SIB (e.g., SIB4) or a new SIB, and the RRC message is an RRCReconfiguration message, an RRCResume message, an RRCRelease message, or a new RRC message configuring the UE 102 to perform measurements in idle or inactive state. The MN 104 transmits the RRC message or broadcasts the SIB to the UE 102 on a first 5G NR carrier frequency (e.g., in a frequency range 1 (FR1)). The MeasConfig configures a second 5G NR carrier frequency (e.g., in a FR1 or a frequency range 2 (FR2)) for the SN 106. In response, the UE 102 measures the second 5G NR carrier frequency, and reports the measurement results in the measurement report message back to the MN 104.

Provided that the measurement report message indicates that the signal strength or quality of the carrier frequency of the SN 106 is suitable (e.g., meets a certain threshold) for DC, the UE 102 enables 1119 the MN 104 to initiate an SN addition procedure with the SN 106. In some implementations, the measurement report message can be a MeasurementReport message, a UEInformationResponse message, or an RRC message defined to include measurement results measured during idle state or inactive state.

FIG. 12 depicts a messaging diagram 1200 for preventing, by the UE 102 operating in a connected state of the RRC protocol, the MN 104 from initiating an SN addition procedure by not providing a measurement report pertaining to the SN 106.

At the beginning of this scenario, the UE 102 operates 1204 in a connected state, similar to event 605 in the scenario of FIG. 6. Accordingly, the UE 102 operates 1205 in SC with MN 104 on a carrier frequency of the MN 104. Events 1206, 1208, 1210, 1212, 1213, 1214, 1215, 1216, and 1218 also are similar to events 1104, 607, 1110, 1112, 1113, 1114, 1115, 1116, and 1118 discussed above.

Exemplary implementations of the UE 102 are described below for the UE 102 enabling the DC capability. In some implementations, the UE 102 transmits 1218 a measurement report message to the MN 104 in response to the MN 104 transmitting 1210 or 1215 a measurement configuration (e.g., MeasConfig) for the carrier frequency of the SN 106 to the UE 102. The measurement configuration can include a carrier frequency configuration configuring the carrier frequency of the SN 106 to be measured. The MN 104 can include the measurement configuration in an RRC message or in an SIB. The MN 104 transmits the RRC message to the UE 102 via an SRB or broadcasts the SIB to the UE 102. In one particular implementation, if both the MN 104 and the SN 106 are 5G NR base stations (e.g., gNBs), the RRC message can be an RRCReconfiguration message, an RRCResume message, or an RRCRelease message, and the SIB can be an existing SIB (e.g., SIB4) or a new SIB. The MN 104 transmits the RRC message to the UE 102 on a first 5G NR carrier frequency (e.g., in a frequency range 1 (FR1)). The measurement configuration configures a second 5G NR carrier frequency (e.g., in FR1 or a frequency range 2 (FR2)) for the SN 106. In response, the UE 102 measures the second 5G NR carrier frequency, and reports the measurement results in the measurement report message back to the MN 104. In some implementations, the measurement report message can be a MeasurementReport message, a UEInformationResponse message, or an RRC message defined to include measurement results measured in idle state or inactive state.

In another implementation, if the MN 104 is an E-UTRA base station (e.g., eNB or ng-eNB) and the SN 106 is a 5G NR base station (e.g., gNB), the SIB can be a SystemInformationBlockType24, and the RRC message can be an RRC-ConnectionReconfiguration message, an RRCConnectionResume message, an RRCConnectionRelease message, or a new RRC message configuring the UE 102 to perform measurements in idle or inactive state. The MN 104 transmits the RRC message or broadcasts the SIB to the UE 102 on an E-UTRA carrier frequency. The measurement configuration configures a 5G NR carrier frequency for the SN 106. In response, the UE 102 measures the 5G NR carrier frequency, and reports the measurement results in the measurement report message back to the MN 104.

Provided that the measurement report message indicates that the signal strength or quality of the carrier frequency of the SN 106 is suitable (e.g., meets a threshold) for DC, the UE 102 enables 1219 the MN 104 to initiate an SN addition procedure with the SN 106, similar to event 1119.

Figure 13:
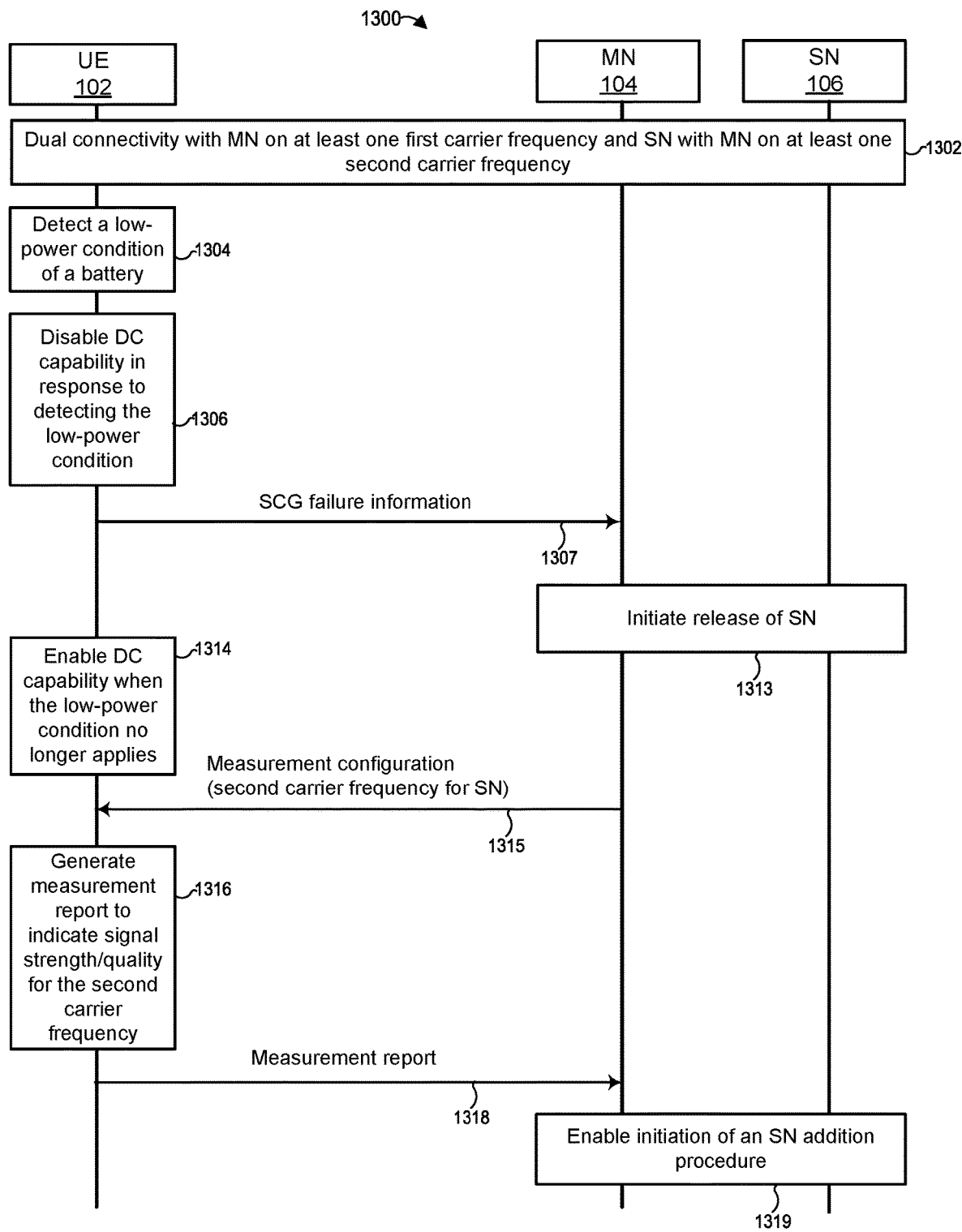
FIG. 13 is a messaging diagram of an example scenario in which a UE prevents an MN from initiating an SN addition procedure by transmitting an indication of SCG failure to the MN.

FIG. 13 depicts a messaging diagram 1300 of an example scenario in which the UE 102 prevents the MN 104 from initiating an SN addition procedure, by transmitting an indication of SCG failure to the MN 104.

At the beginning of this scenario, the UE 102 operates 1302 in DC with the MN 104 on a carrier frequency of the MN 104 and the SN 106 on a carrier frequency of the SN 106. The UE 102 disables 1306 DC capability in response to event 1304. Event 1304 is similar to the event 406 discussed above.

The UE 102 then detects SCG failure and suspends SCG transmission for all SRBs and DRBs configured to use the resources provided by the SN 106 in response to disabling 1306 DC capability. In other words, if the UE 102 detects event 1304, the UE 102 reports SCG failure occurs, even though the UE 102 may still be capable of communicating with the SN 106. The UE 102 generates an indication of SCG failure to notify 1307 the MN 104 that the UE 102 will no longer be using DC. In some implementations, the UE 102 indicates that the UE 102 will no longer be using DC in an SCG failure message. The SCG failure message can be an SCG Failure Information message, an SCG Failure Information NR message, or an SCG Failure Information EUTRA message. The UE 102 transmits an SCG failure message to the MN 104 via an SRB (e.g., SRB1). The SCG failure message can include a first failure type and/or a second failure type. The first failure type can be set to t310-Expiry, randomAccessProblem, rlc-MaxNumRetx, synchReconfigFailure-SCG, scg-reconfigFailure, or srb3-IntegrityFailure, for example, and the second failure type can be set to an indication of the low-power condition of the battery 103. By sending the indication of SCG failure to the MN 104, the UE 102 can cause the MN 104 to initiate 1313 release of the SN 106 SN (SN release or DC release) while continuing to support SC between the UE 102 and the MN 104. The UE 102 in this case prevents the MN 104 from performing a procedure for recovering from SCG failure.

In some implementations, the UE 102 may include an "artificial" measurement result in the SCG failure message that simulates to the MN 104 or the SN 106 low signal strength and/or low signal quality of the carrier frequency of the SN 106, regardless of whether the signal strength and/or the signal quality are in fact low, or even though the signal strength and/or the signal quality are in fact high or sufficient for communication. In other implementations, the UE 102 excludes measurement results in the SCG failure message that indicate to the MN 104 or the SN 106 high signal strength and/or high signal quality of the carrier frequency of the SN 106. In further implementations, the UE 102 excludes any measurement result in the SCG failure message.

In some cases, the MN 104 may transmit an RRC reconfiguration message to the UE 102 in response to the SCG failure message. The MN 104 indicates the UE 102 to release the SN 106 in the RRC reconfiguration message. In response to the RRC reconfiguration message, the UE 102 releases configurations (e.g., SCG configuration or cell group configuration) for communicating with the SN 106.

In some implementations, if the UE 102 is configured to measure at least one carrier frequency of the SN 106 (or another SN) in response to a measurement configuration received from the MN 104 or the SN 106 (or another SN), similar to event 1210, the UE 102 can stop measuring one or more of the at least one carrier frequency of the SN 106 upon disabling 1306 DC capability. The UE 102 can also continue measuring the remaining at least one second carrier frequency in response to another measurement configuration received from the MN 104 or the SN 106 (or another SN). In other implementations, if the UE 102 is configured to measure carrier frequencies of the SN 106 (or another SN) in response to a measurement configuration received from the MN 104 or the SN 106 (or another SN), the UE 102 can still continue measuring at least one carrier frequency of the SN 106 upon disabling 1306 DC capability. In this case, the UE 102 does not transmit a measurement report to the MN 104 that indicates high signal strength and/or signal quality of the at least one carrier frequency, or the UE 102 transmits one or more artificial measurement reports to the MN 104 for the at least one carrier frequency as described above. In further implementations, the UE 102 can stop measuring all of the at least one carrier frequency upon disabling 1306 DC capability. In additional implementations, the UE 102 disables one or more RF chains/chips used to receive the at least one carrier frequency of the SN 106, upon disabling the DC capability, thereby reducing power consumption. The at least one carrier frequency may or may not include carrier frequency/frequencies in the at least one second carrier frequency.

Events 1314, 1315, 1316, and 1318 are similar to the events 1114, 1115, 1116, and 1118 discussed above. In some implementations, the low-power condition of the event 1314 can be the same low-power condition (e.g., the remaining power level is below a first threshold level) as in the event 1304 or a different low-power condition (e.g., the remaining power level is below a second threshold level that is higher than or lower than the first threshold level). If the UE 102 is configured to measure a carrier frequency of the SN 106 (or another SN) in response to a measurement configuration 1315 received from the MN 104 or the SN 106 (or another SN), the UE 102 begins measuring the carrier frequency. The UE 102 can generate 1316 the measurement report message including the measurement result, and transmit 1318 the measurement report message to the MN 104. Accordingly, the MN 104 can configure the UE 102 to connect to the SN 106 (or another SN) if the measurement report message indicates that the UE 102 has high signal strength and/or high signal quality on the carrier frequency (i.e., the UE 102 is within the coverage area of the SN 106 (or another SN)).

In some implementations, the UE 102 does not transmit 1318 the measurement report message to the MN 104 if the temperature of the UE 102 (or one of the components of the processing hardware of the UE 102, such as the DC controller 118, power management module 120, EUTRA module 114, and/or the NR module 116) measured by the thermal management module exceeds the low-power condition (e.g., the temperature level is above a third threshold level). The UE 102 can transmit 1318 the measurement report message to the MN 104 if the temperature of the UE 102 does not exceed the low-power condition (e.g., the temperature level is below the third threshold level).

Event 1319 is similar to the event 1119 discussed above. The MN 104 can perform a procedure for recovering from SCG failure or configuring the SCG of the SN 106 or another SN (not shown to avoid clutter). To this end, the MN 104 can transmit an RRC reconfiguration message to the UE 102 to resume the SCG transmission that was suspended previously, using a DRB. In response, the UE 102 resumes the SCG transmission using the DRB to communicate data to the MN 104. The UE 102 may also transmit an RRC reconfiguration complete message to the MN 104 in response to the RRC reconfiguration message. If the MN 104 is an E-UTRA base station (e.g., eNB or ng-eNB), the RRC reconfiguration message can be an RRC Connection Reconfiguration message and the RRC reconfiguration complete message can be an RRC Connection Reconfiguration Complete message. If the MN 104 is a 5G NR base station (e.g., gNBs), the RRC reconfiguration message can be an RRC Reconfiguration message and the RRC reconfiguration complete message can be an RRC Reconfiguration Complete message.

Figure 14:
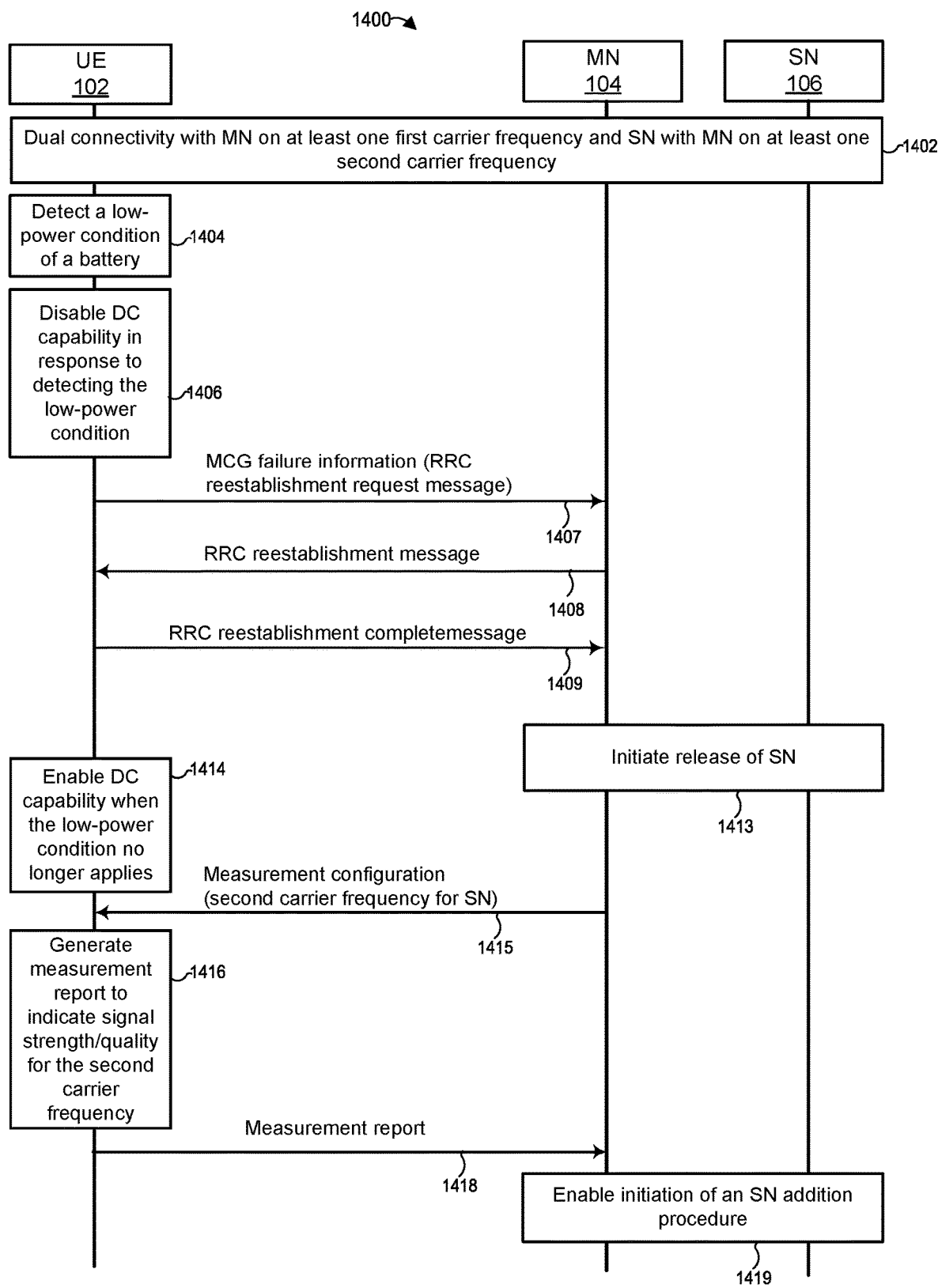
FIG. 14 is a messaging diagram of an example scenario in which a UE prevents an MN from initiating an SN addition procedure by transmitting an indication of MCG failure to the MN.

FIG. 14 depicts a messaging diagram 1400 of an example scenario in which the UE 102 prevents the MN 104 from initiating an SN addition procedure, by transmitting an indication of MCG failure to the MN 104.

At the beginning of this scenario, the UE 102 operates 1402 in DC with the MN 104 on a carrier frequency of the MN 104 and the SN 106 on a carrier frequency of the SN 106, similar to event 1302 in the scenario of FIG. 13. Events 1404 and 1406 are also similar to the events 1304 and 1306 discussed above.

In response to disabling 1406 DC capability, the UE 102 then detects MCG failure and suspends MCG transmission for all SRBs and DRBs configured to use the resources provided by the MN 104. In other words, if the UE 102 detects event 1404, the UE 102 reports MCG failure occurs, even though the UE 102 may still be capable of communicating with the MN 104. The UE 102 generates an indication of MCG failure to notify 1407 the MN 104 that the UE 102 will no longer be using DC. In some implementations, the UE 102 indicates that the UE 102 will no longer be using DC in an RRC reestablishment request message. The UE 102 transmits an RRC reestablishment request message to the MN 104 in an SRB (e.g., SRB0). The RRC reestablishment request message can indicate a failure type, which can be reconfigurationFailure, handoverFailure, otherFailure, or an indication of the low-power condition of the battery 103. If the MN 104 is an E-UTRA base station (e.g., eNB or ng-eNB), the RRC reestablishment request message is an RRC Connection Reestablishment Request message. If the MN 104 is an 5G NR base station (e.g., gNBs), the RRC reestablishment request message is an RRC Reestablishment Request message.

In response to transmitting the RRC reestablishment request message to the MN 104, the UE 102 may receive 1408 an RRC reestablishment message from the MN 104. If the MN 104 is an E-UTRA base station (e.g., eNB or ng-eNB), the RRC reestablishment message is an RRC Connection Reestablishment message, and the UE 102 may receive the RRC reestablishment message from the MN 104 in SRB0. If the MN 104 is an 5G NR base station (e.g., gNBs), the RRC reestablishment message is an RRC Reestablishment message, and the UE 102 may receive the RRC reestablishment message from the MN 104 in an SRB1.

In response to receiving the RRC reestablishment message from the MN 104, the UE 102 may transmit 1409 an RRC reestablishment complete message to the MN 104 in SRB1, for example. If the MN 104 is an E-UTRA base station (e.g., eNB or ng-eNB), the RRC reestablishment complete message is an RRC Connection Reestablishment Complete message. If the MN 104 is an 5G NR base station (e.g., gNBs), the RRC reestablishment complete message is an RRC Reestablishment Complete message. By sending the RRC reestablishment complete message to the MN 104, the UE 102 can enable the MN 104 to initiate 1413 release of SN 106 (e.g., prevent the MN 104 from performing a procedure for recovering from the MCG failure), similar to the event 1313 discussed above.

Events 1414, 1415, 1416, and 1418 are similar to the events 1314, 1315, 1316, and 1318 discussed above.

Further, event 1419 is similar to the event 1319 discussed above. The MN 104 can perform a procedure for recovering from MCG failure (not shown to avoid clutter). To this end, the MN 104 can transmit an RRC reconfiguration message to the UE 102 to resume the MCG transmission that was suspended earlier using a DRB. In response, the UE 102 resumes the MCG transmission using the DRB to communicate data to the MN 104. The UE 102 may also transmit an RRC reconfiguration complete message to the MN 104 in response to the RRC reconfiguration message. If the MN 104 is an E-UTRA base station (e.g., eNB or ng-eNB), the RRC reconfiguration message can be an RRC Connection Reconfiguration message and the RRC reconfiguration complete message can be an RRC Connection Reconfiguration Complete message. If the MN 104 is an 5G NR base station (e.g., gNBs), the RRC reconfiguration message can be an RRC Reconfiguration message, and the RRC reconfiguration complete message can be an RRC Reconfiguration Complete message.

Figure 15:
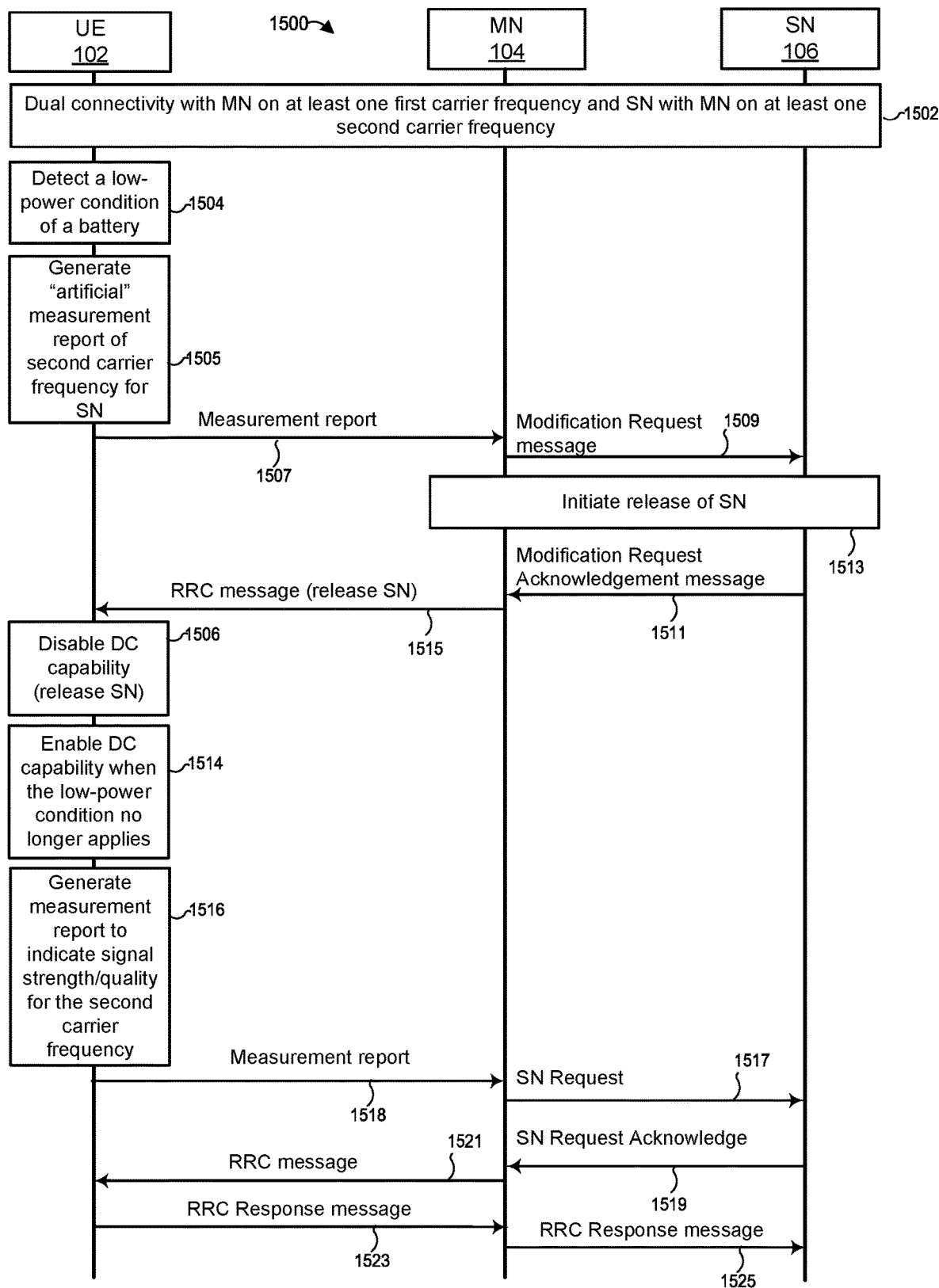
FIG. 15 is a messaging diagram of an example scenario in which a UE causes an MN to initiate an SN release, by providing an "artificial" measurement report pertaining to the SN.

FIG. 15 depicts a messaging diagram 1500 of an example scenario in which the UE 102 enables the MN 104 to initiate an SN release, by providing an "artificial" measurement report pertaining to the SN 106.

At the beginning of this scenario, the UE 102 operates 1502 in DC with the MN 104 on at least one carrier frequency of the MN 104 and the SN 106 on at least one carrier frequency of the SN 106, similar to the event 1402 in the scenario of FIG. 14. Event 1504 is also similar to the event 1404 discussed above.

In response to detecting a low-power condition of the battery 103, the UE 102 can notify the MN 104 that the UE 102 has disabled DC capability to prevent the MN 104 from configuring the UE 102 to connect to the SN 106. In some implementations, the UE 102 implicitly notifies the MN 104 by generating 1505 and transmitting 1507 an "artificial" measurement report message to the MN 104 that simulates to the MN 104 low signal strength and/or low signal quality of the carrier frequency of the SN 106, regardless of whether the signal strength and/or the signal quality are in fact low, or even though the signal strength and/or the signal quality are in fact high or sufficient for communication, similar to the event 1112 in the scenario of FIG. 11. Accordingly, the UE 102 causes the MN 104 to initiate 1513 release of the SN 106, similar to the events 1313 and 1413 discussed above. The MN 104 can transmit 1515 an RRC message to the UE 102 to configure the UE 102 to release the SN 106 (i.e., release all of the at least one second carrier frequency) in response. The UE 102 can transmit an RRC response message (not shown to avoid clutter) to the MN 104 in response. If the MN 104 is an E-UTRA base station (e.g., eNB or ng-eNB), the RRC message can be an RRC Connection Reconfiguration message and the RRC response message can be an RRC Connection Reconfiguration Complete message. If the MN 104 is an 5G NR base station (e.g., gNBs), the RRC message can be an RRC Reconfiguration message and the RRC response message can be an RRC Reconfiguration Complete message. In some scenarios (not shown to avoid clutter), the MN 104 can send an SN Release Request message to the SN 106 in response to the MN 104 initiating release of the SN 106, before or after transmitting 1515 the RRC message to the UE 102 described above. In such scenarios, the SN 106 may transmit an SN Release Acknowledge message to the MN 104 in response.

In other implementations, the UE 102 implicitly notifies the MN 104 by generating and transmitting an "artificial" measurement report message to the MN 104 that simulates low signal strength and/or low signal quality of some (i.e., one or more, but not all) of the carrier frequencies of the SN 106, regardless of whether the signal strength and/or the signal quality are in fact low. Accordingly, the "artificial" measurement report message triggers the MN 104 to initiate release of some (i.e., one or more, but not all) of the carrier frequencies of the SN 106. In one such implementation, the MN 104 determines to release some of the carrier frequencies of the SN 106 for the UE 102. In response to receiving the "artificial" measurement report message from the UE 102, the MN 104 sends 1509 an SN Request message to the SN 106, requesting the SN 106 to release some of the carrier frequencies. In response to the SN Request message, the SN 106 generates an RRC message indicating release of some of the carrier frequencies. The SN 106 sends 1511 an SN Request Acknowledge message, which includes the RRC message, to the MN 104 in response to the SN Request message. The MN 104 then transmits 1515 the RRC message to the UE 102. The UE 102 then releases some of the carrier frequencies of the SN 106 in response to the RRC message. The UE 102 may transmit an RRC response message in response to the RRC message. The MN 104 can forward the RRC response message to the SN 106. By not communicating with the SN 106 on some of the carrier frequencies of the SN 106 (i.e., communicating with the SN 106 on the remainder of the carrier frequencies of the SN 106), the UE 102 reduces the amount of heat the chip supporting the RAT of the SN 106 generates.

In some implementations, the UE 102 can indicate some (i.e., one or more, but not all) of the carrier frequencies of the SN 106 in a prioritized manner in "artificial" measurement report messages and transmit the "artificial" measurement report messages to the MN 104. For example, if the carrier frequencies of the SN 106 include an unlicensed carrier frequency and a licensed carrier frequency, the UE 102 can indicate the unlicensed carrier frequency in a first "artificial" measurement report message and transmits the first "artificial" measurement report message to the MN 104. The first "artificial" measurement report message may cause the MN 104 to configure the UE 102 to release the unlicensed carrier frequency. If the low-power condition is still met after the UE 102 releases the unlicensed carrier frequency, the UE 102 indicates the licensed carrier frequency in a second "artificial" measurement report message and transmits the second "artificial" measurement report message to the MN 104. The second "artificial" measurement report message may cause the MN 104 to configure the UE 102 to release the unlicensed carrier frequency.

As another example, the UE 102 can prioritize indicating a higher carrier frequency of the SN 106 over a lower carrier frequency. For instance, if carrier frequencies of the SN 106 include carrier frequencies in a certain range, such as FR2 (e.g., above 6 Ghz or 7.125 Ghz), and another range, such as FR1 (e.g., below 6Ghz or 7.125 Ghz), the UE 102 can indicate carrier frequencies in the range FR2 before indicating carrier frequencies in the range FR1. For example, if the carrier frequencies of the SN 106 include a first carrier frequency in FR2 and a second carrier frequency in FR1, the UE 102 can indicate the first carrier frequency in a first "artificial" measurement report message and transmits the first "artificial" measurement report message to the MN 104. The first "artificial" measurement report message may cause the MN 104 to configure the UE 102 to release the first carrier frequency. If the low-power condition is still met after the UE 102 releases the first carrier frequency, the UE 102 indicates the second carrier frequency in a second "artificial" measurement report message and transmits the second "artificial" measurement report message to the MN 104. The second "artificial" measurement report message may cause the MN 104 to configure the UE 102 to release the second carrier frequency.

As another example, the UE 102 can prioritize indicating one or more carrier frequencies of the SN 106, usage of which causes the UE 102 to generate more heat. For example, if the carrier frequencies of the SN 106 include a first carrier frequency, usage of which causes the UE to generate more heat than using a second carrier frequency, the UE 102 can indicate the first carrier frequency in a first "artificial" measurement report message and transmits the first "artificial" measurement report message to the MN 104. The first "artificial" measurement report message may cause the MN 104 to configure the UE 102 to release the first carrier frequency. If the low-power condition is still met after the UE 102 releases the first carrier frequency, the UE 102 indicates the second carrier frequency in a second "artificial" measurement report message and transmits the second "artificial" measurement report message to the MN 104. The second "artificial" measurement report message may cause the MN 104 to configure the UE 102 to release the second carrier frequency.

In some implementations of the UE 102 configured to release the SN 106, the DC controller 118 releases 1506 at least one of the carrier frequencies of the SN 106 in response to detecting 1504 a low-power condition, rather than in response to receiving 1515 the RRC message. In such implementations, the UE 102 can release carrier frequencies of the SN 106 in a prioritized manner. For example, if carrier frequencies of the SN 106 include one or more unlicensed carrier frequencies and licensed carrier frequencies, the UE 102 can release one or more unlicensed carrier frequencies before releasing one or more licensed carrier frequencies. As another example, the UE 102 can prioritize releasing higher carrier frequencies of the SN 106 before lower carrier frequencies. For instance, if the carrier frequencies of the SN 106 include carrier frequencies in a certain range, such as FR2 (e.g., above 6 Ghz or 7.125 Ghz), and another range, such as FR1 (e.g., below 6 Ghz or 7.125 Ghz), the UE 102 can release a carrier frequency in the range FR2 before releasing a carrier frequency in the range FR1. As another example, the UE 102 can prioritize releasing some (e.g., one or more) of those carrier frequencies of the SN 106, usage of which causes the UE 102 to generate more heat.

In another implementation, in response to detecting 1504 a low-power condition, the DC controller 118 transmits channel quality indicators (CQIs) on physical uplink control channel(s) (PUCCH(s)), where the CQIs simulate to the MN 104 low channel quality of at least one of the carrier frequencies of the SN 106, regardless of whether the channel quality is in fact low or even though the signal strength and/or the signal quality are in fact high or sufficient for communication. For example, zero or another predefined value (or a range of values) designates low channel quality. After the UE 102 determines that the low-power condition no longer applies, the DC controller 118 transmits CQIs to the MN 104 indicating real channel quality of at least one of the carrier frequencies of the SN 106.

Accordingly, the MN 104 can transmit 1515 the RRC message to the UE 102 to configure the UE 102 to release the SN 106 in response to the RRC message. The UE 102 then disables 1506 DC operation with the SN 106 (i.e., releases the SN 106) in response to the RRC message.

Events 1514, 1516, and 1518 are similar to the events 1414, 1416, and 1418 discussed above.

When, according to the signal strength or quality of at least one carrier frequency indicated 1518 in the measurement report message, the UE 102 is within the area of coverage of the SN 106 (e.g., the UE 102 meets a threshold for DC), the UE 102 can enable the MN 104 to initiate an SN addition procedure with the SN 106. In some implementations, the UE 102 sends 1518 the measurement report message to the MN 104 so that the MN 104 can initiate a procedure for adding back at least one carrier frequency of the SN 106 for communication with the SN 106. In response, the MN 104 transmits 1517 an SN Request message (e.g., SN Addition Request message or SN Modification Request message) to the SN 106 to request that the SN 106 configure the UE 102 to receive downlink transmissions from the SN 106 on the at least one carrier frequency. In response to the SN Request message, the SN 106 generates an RRC message configuring the UE 102 to receive downlink transmissions from the SN 106 on the at least one carrier frequency and sends 1519 an SN Request Acknowledge message (e.g., SN Addition Request Acknowledge message or SN Modification Request Acknowledge message) including the RRC message to the MN 104. In response, the MN 104 transmits 1521 the RRC message to the UE 102. The UE 102 then can receive downlink transmissions from the SN 106 on the at least one carrier frequency according to the RRC message. The UE 102 can transmit 1523 an RRC Response message (e.g., RRC Reconfiguration Complete message) to the MN 104 in response to the RRC message (e.g., RRC Reconfiguration message). The MN 104 can forward 1525 the RRC response message to the SN 106.

Figure 16:
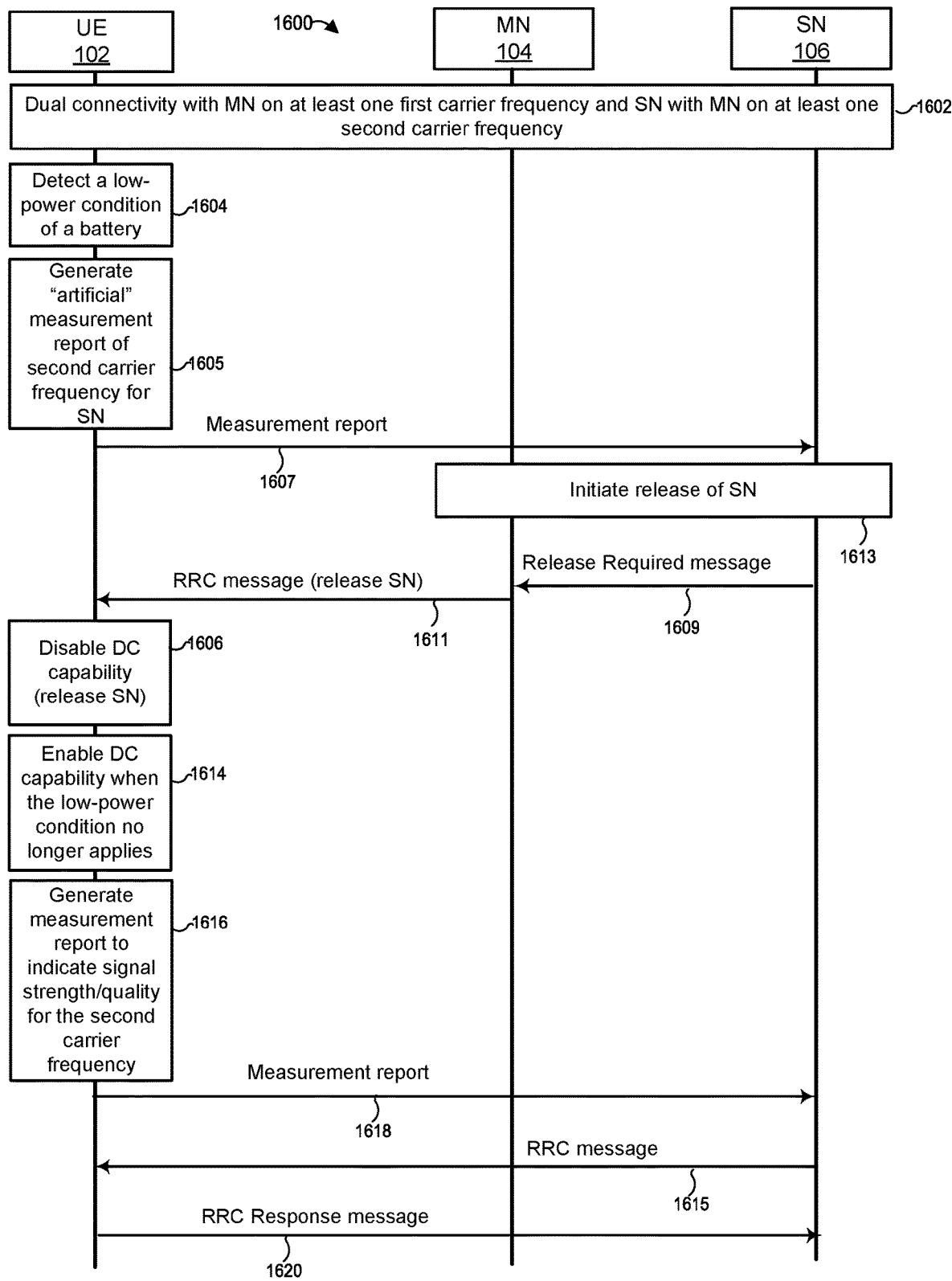
FIG. 16 is a messaging diagram of an example scenario in which a UE causes an SN to initiate an SN release, by providing an "artificial" measurement report pertaining to the SN.

FIG. 16 depicts a messaging diagram 1600 of an example scenario in which the UE 102 enables the SN 106 to initiate an SN release, by providing an "artificial" measurement report pertaining to the SN 106.

At the beginning of this scenario, the UE 102 operates 1602 in DC with the MN 104 on at least one carrier frequency of the MN 104 and the SN 106 on at least one carrier frequency of the SN 106, similar to the event 1502 in the scenario of FIG. 15. Event 1604 is similar to the event 1504 discussed above.

In response to detecting a low-power condition of the battery 103, the UE 102 can notify the SN 106 that the UE 102 has disabled DC capability to prevent the SN 106 from configuring the UE 102 to connect to the SN 106. In some implementations, the UE 102 implicitly notifies the SN 106 or both the MN 104 and the SN 106 (i.e., in contrast to implicitly notifying the MN 104 described in FIG. 15) by generating 1605 and transmitting 1607 an "artificial" measurement report message to the SN 106 via the MN 104 that simulates to the SN 104 low signal strength and/or low signal quality of the carrier frequency of the SN 106, regardless of whether the signal strength and/or the signal quality are in fact low or even though the signal strength and/or the signal quality are in fact high or sufficient for communication. The UE 102 can transmit the "artificial" measurement report message to the SN 106 using radio resources of the MN 104 or radio resources of the SN 106, such as an SRB (e.g., SRB3). Accordingly, the "artificial" measurement report message triggers the SN 106 to initiate 1613 release of the SN 106. The SN 106 can transmit 1609 an SN Release Required message to the MN 104 in response, and the MN 104 can transmit 1611 the RRC message to the UE 102 to configure the UE 102 to release the SN 106 in response to the SN Release Required message. In some scenarios (not shown to avoid clutter), the MN 104 can send an SN Release Confirm message to the SN 106 in response to the SN Release Required message, before or after transmitting 1611 the RRC message to the UE 102 described above. In such scenarios, the UE 102 can transmit an RRC response message to the MN 104 in response. If the MN 104 is an E-UTRA base station (e.g., eNB or ng-eNB), the RRC message can be an RRC Connection Reconfiguration message and the RRC response message can be an RRC Connection Reconfiguration Complete message. If the MN 104 is an 5G NR base station (e.g., gNBs), the RRC message can be an RRC Reconfiguration message and the RRC response message can be an RRC Reconfiguration Complete message.

In other implementations, the UE 102 implicitly notifies the SN 106 by generating and transmitting an "artificial" measurement report message to the SN 106 that simulates low signal strength and/or low signal quality of some (i.e., one or more, but not all) of the carrier frequencies of the SN 106, regardless of whether the signal strength and/or the signal quality are in fact low. Accordingly, the "artificial" measurement report message triggers the SN 106 to initiate release of some (i.e., one or more, but not all) of the carrier frequencies of the SN 106. In one such implementation, the SN 106 determines to release some of the carrier frequencies of the SN 106 for the UE 102. In response to receiving the "artificial" measurement report message from the UE 102, the SN 106 generates an RRC message indicating release of some of the carrier frequencies. The SN 106 sends the RRC message to the UE 102 via the MN 104 using radio resources of the MN 104 or radio resources of the SN 106, such as an SRB (e.g., SRB3). The UE 102 then releases some of the carrier frequencies of the SN 106 in response to the RRC message, thereby reducing the amount of heat the chip supporting the RAT of the SN 106 generates. If the UE 102 receives the RRC message from the MN 104, the UE 102 transmits an RRC response message to the MN 104, as discussed above. If the UE 102 receives the RRC message from the SN 106 using an SRB, the UE 102 can transmit an RRC response message (e.g., RRC Reconfiguration Complete message) to the SN 106 by using radio resources of the SN 106 in response to the RRC message (e.g., RRC Reconfiguration message).

Accordingly, the SN 106 can transmit 1611 the RRC message to the UE 102 to configure the UE 102 to release the SN 106 in response to the RRC message. The UE 102 then disables 1606 DC operation with the SN 106 (i.e., releases the SN 106) in response to the RRC message, similar to event 1506 of FIG. 15.

Events 1614, 1616, and 1618 are similar to the events 1514, 1516, and 1518 discussed above.

When, according to the signal strength or quality of at least one carrier frequency indicated 1618 in the measurement report message, the UE 102 is within the area of coverage of the SN 106 (e.g., the UE 102 meets a threshold for DC), the UE 102 can enable the MN 104 to initiate an SN addition procedure with the SN 106. In some implementations, the UE 102 sends 1618 the measurement report message to the SN 106 via the MN 104 using radio resources of the MN 104 or radio resources of the SN 106, such as an SRB (e.g., SRB3) so that the SN 106 can initiate adding back at least one carrier frequency of the SN 106 for communication with the SN 106. Accordingly, the SN 106 can configure the UE 102 to receive transmissions from the SN 106 on the at least one carrier frequency. The SN 106 can transmit 1615 an RRC message (e.g., RRC Reconfiguration message) to the UE 102 in response to the measurement report message to configure the UE 102 to receive transmissions from the SN 106 on the at least one carrier frequency. The UE 102 can transmit 1620 an RRC response message (e.g., RRC Reconfiguration Complete message) to the SN 106 in response.

In some implementations, if the UE 102 is configured by the SN 106 to use a DRB, such as an SCG type bearer or an SCG split type bearer, the RRC message can reconfigure the DRB to be an MCG type bearer. The UE 102 then can communicate data with the MN 104 using the DRB in response to the RRC message.

Figure 17:
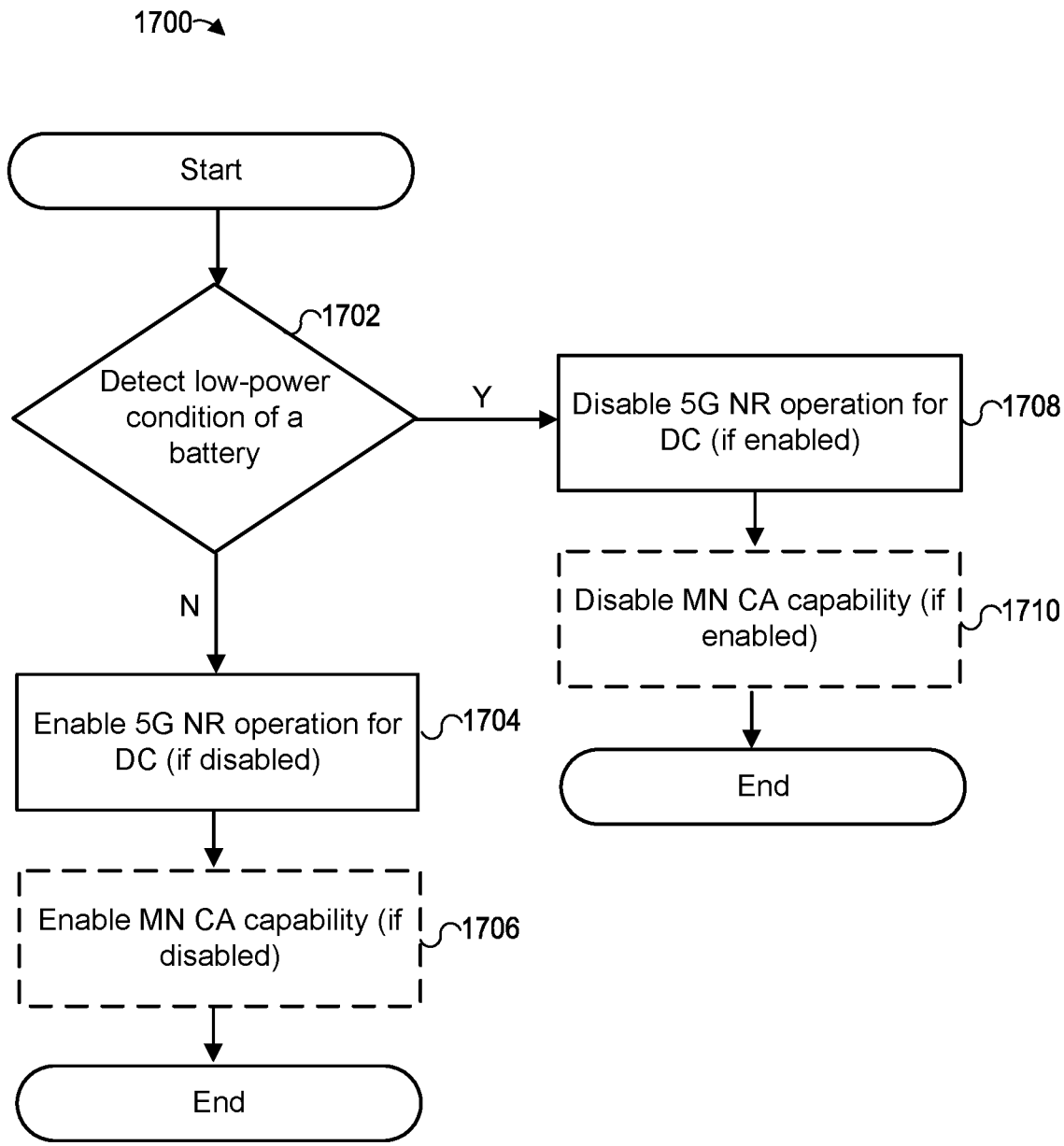
FIG. 17 is a flow diagram of an example method for determining whether the UE should disable 5G NR operation for DC and (optionally) CA capability in view of detecting a low-power condition of the battery, which can be implemented in the UE of FIG. 1.

FIG. 17 depicts an example method 1700 for determining whether the UE 102 should disable 5G NR operation for DC and (optionally) CA capability in view of detecting a low-power condition of the battery.

The method 1700 begins at block 1702, where the UE 102 determines whether a low-power condition of the battery 103 has occurred, similar to block 202 of FIG. 2. If the UE 102 does not detect a low-power condition, the UE 102 at block 1704 enables 5G NR operation for DC when 5G NR operation previously is disabled. In another scenario, the UE 102 keeps 5G NR operation for DC enabled, when 5G NR operation is already enabled. Examples of an 5G NR operation include transmitting uplink transmissions (e.g., transmitting an uplink reference signal such as a sounding reference signal (SRS), transmissions on PUCCH, transmissions on PUSCH) over 5G NR to the SN 106, receiving downlink transmissions (e.g., receiving a reference signal, such as a channel state information reference signal (CSI-RS), and/or a synchronization signal block (SSB), transmissions on PDCCH, transmissions on PDSCH) over 5G NR from the SN 106, and/or measuring at least one 5G NR carrier frequency of the SN 106.

However, if the UE 102 detects a low-power condition, the UE 102 at block 1708 disables 5G NR operation for DC, if 5G NR operation previously is enabled. For example, the UE 102 can stop receiving downlink transmissions over 5G NR from the SN 106, stop transmitting uplink transmissions over 5G NR to the SN 106, stop measuring at least one 5G NR carrier frequency, and/or keep measuring at least one 5G NR carrier frequency. In another scenario, when 5G NR operation is already disabled, the UE 102 keeps 5G NR operation for DC disabled. In an implementation, the UE 102 turns off or deactivates a 5G NR RF chip configured to communicate with the SN 106 implemented as a gNB to disable 5G NR operation for DC, thereby reducing power consumption. Blocks 1706 and 1710 are similar to blocks 206 and 210 discussed above.

Figure 18:
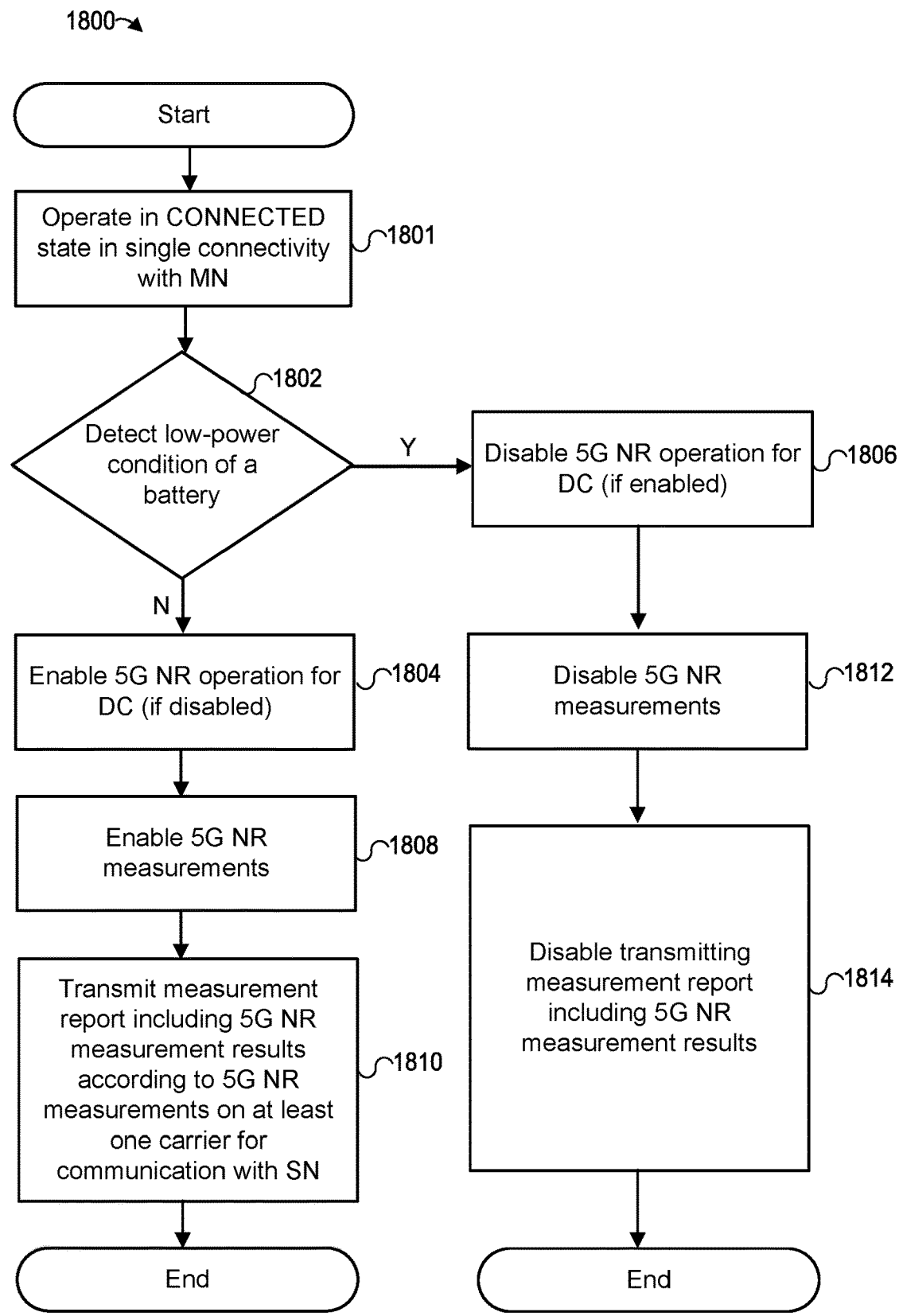
FIG. 18 is a flow diagram of an example method for determining whether a UE operating in a connected state of the RRC protocol should disable 5G NR operation for DC in view of detecting a low-power condition of the battery, which can be implemented in the UE of FIG. 1.

FIG. 18 depicts an example method 1800 for determining whether the UE 102 operating in a connected state of the RRC protocol should disable 5G NR operation for DC in view of detecting a low-power condition of the battery.

The method 1800 begins at block 1801, where the UE 102 operates in a connected state so that the UE 102 can operate in SC with MN 104 on a carrier frequency of the MN 104. The UE 102 at block 1802 determines whether a low-power condition of the battery 103 has occurred, similar to block 1702 discussed above. Blocks 1804 and 1806 are also similar to blocks 1704 and 1708 discussed above.

In some implementations, in addition to enabling 5G NR operation for DC, the UE 102 at block 1808 enables 5G NR measurements. Then, the UE 102 at block 1810 transmits a measurement report message including 5G NR measurement results according to the 5G NR measurements on a carrier for communication with the SN 106 implemented as a gNB.

In some implementations, in addition to disabling 5G NR operation for DC, the UE 102 at block 1812 disables 5G NR measurements. Accordingly, the UE 102 at block 1814 disables transmitting a measurement report message including 5G NR measurement results to the MN 104. Accordingly, the UE 102 prevents the MN 104 from initiating an SN addition procedure with the SN 106 implemented as a gNB, while continuing to support SC between the UE 102 and the MN 104.

Although the method 1800 as illustrated in FIG. 18 completes after block 1810 or block 1814, in general the UE 102 can execute the method 1800 in an iterative manner, e.g., by "looping back" to block 1801 after executing block 1810 or block 1814.

Figure 19:
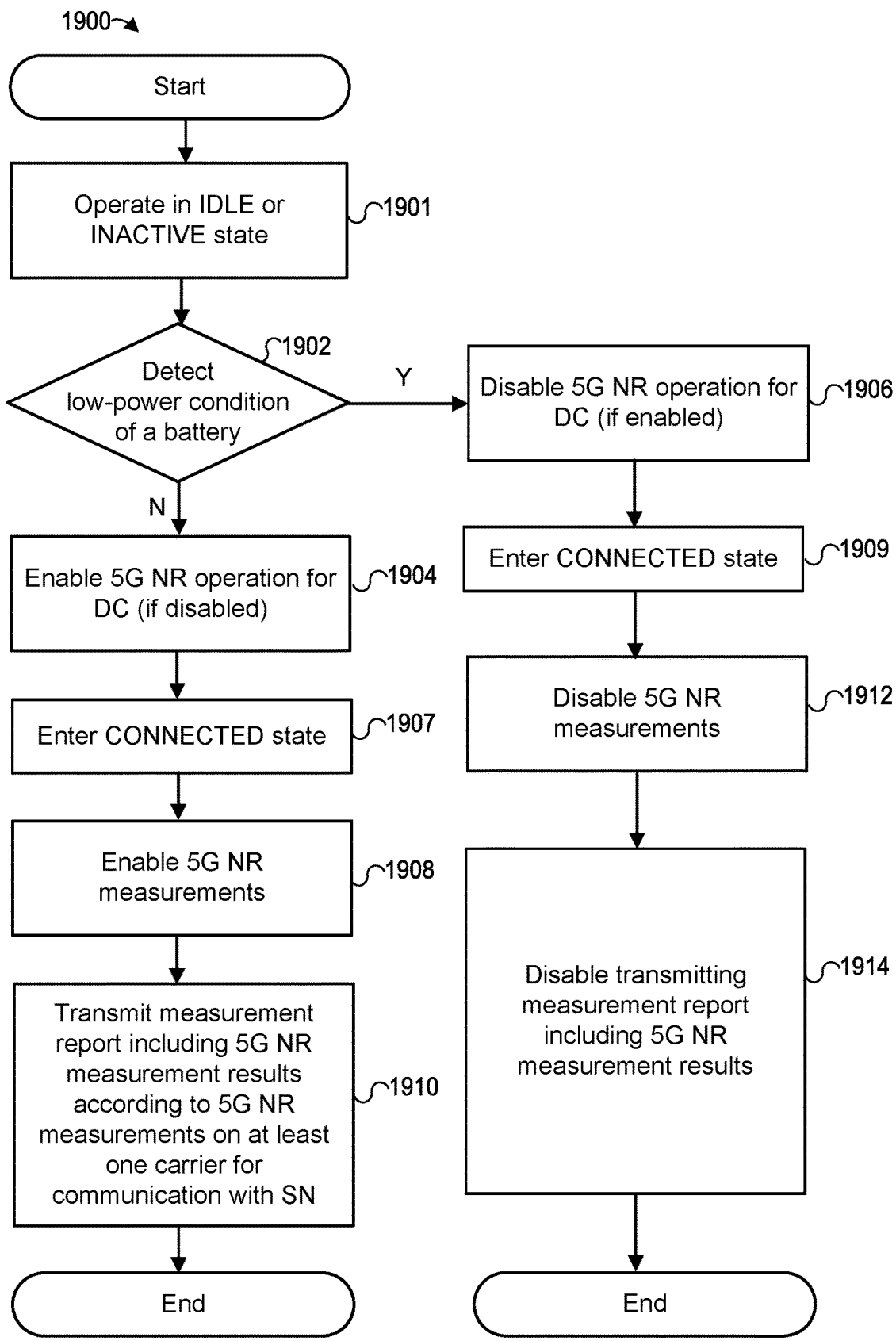
FIG. 19 is a flow diagram of an example method for determining whether a UE operating in an idle or inactive state of the RRC protocol should disable 5G NR operation for DC in view of detecting a low-power condition of the battery, which can be implemented in the UE of FIG. 1.

FIG. 19 depicts an example method 1900 for determining whether the UE 102 operating in an idle or inactive state of the RRC protocol should disable 5G NR operation for DC in view of detecting a low-power condition of the battery.

As illustrated in FIG. 19, the UE 102 at block 1901 operates in an idle state or inactive state prior to detecting a low-power condition of a battery at block 1902. As such, the UE 102 may not yet be operating in a connected state, and therefore may not operate in SC with MN 104 on a carrier frequency of the MN 104. The UE 102 at block 1902 determines whether a low-power condition of the battery 103 has occurred, similar to block 1802 discussed above. Blocks 1902, 1904, 1906, 1908, 1910, 1912, and 1914 are also similar to blocks 1802, 1804, 1806, 1808, 1810, 1812, and 1814 discussed above.

As illustrated, the UE 102 at blocks 1907 and 1909 is in a connected state after the UE 102 at block 1904 enables 5G NR operation for DC and at block 1906 disables 5G NR operation for DC, respectively.

Figure 20:
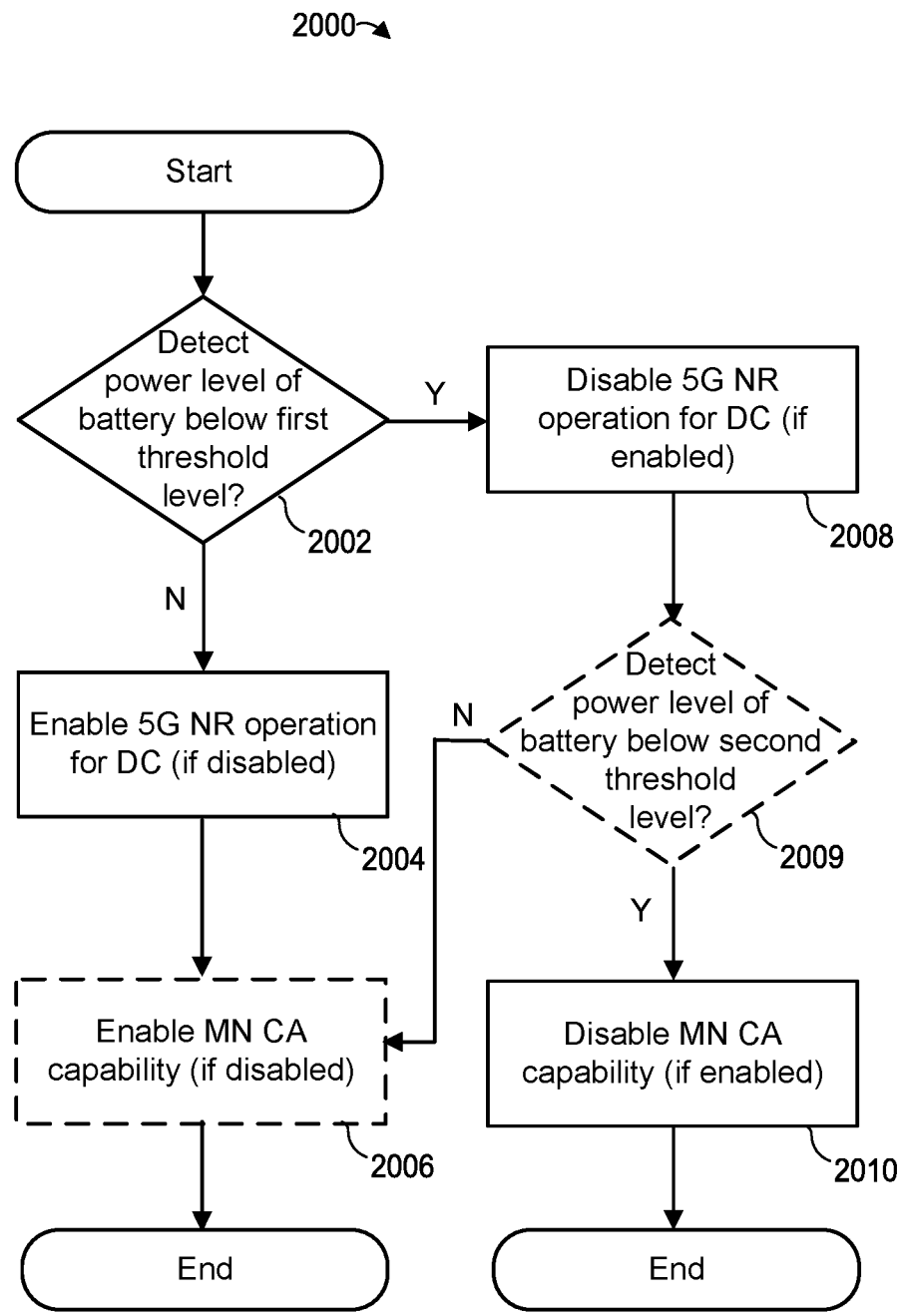
FIG. 20 is a flow diagram of an example method for determining whether the UE should disable 5G NR operation for DC in view of a low-power condition of the battery, and whether the UE should disable CA capability in view of another low-power condition of the battery, which can be implemented in the UE of FIG. 1.

FIG. 20 depicts an example method 2000 for preventing the UE 102 from operating in DC in view of a low-power condition of the battery.

The method 2000 begins at block 2002, where the UE 102 determines whether a low-power condition of the battery 103 (e.g., the remaining power level is below a first threshold level) has occurred, similar to block 1702 discussed above. Blocks 2004, 2006, and 2008 are also similar to blocks 1704, 1706, and 1708 discussed above.

However, if the UE 102 at block 2009 detects a different low-power condition (e.g., the remaining power level is below a second threshold level that is lower than the first threshold level), the UE 102 at block 2010 disables MN CA capability, similar to block 1710 discussed above.

Figure 21:
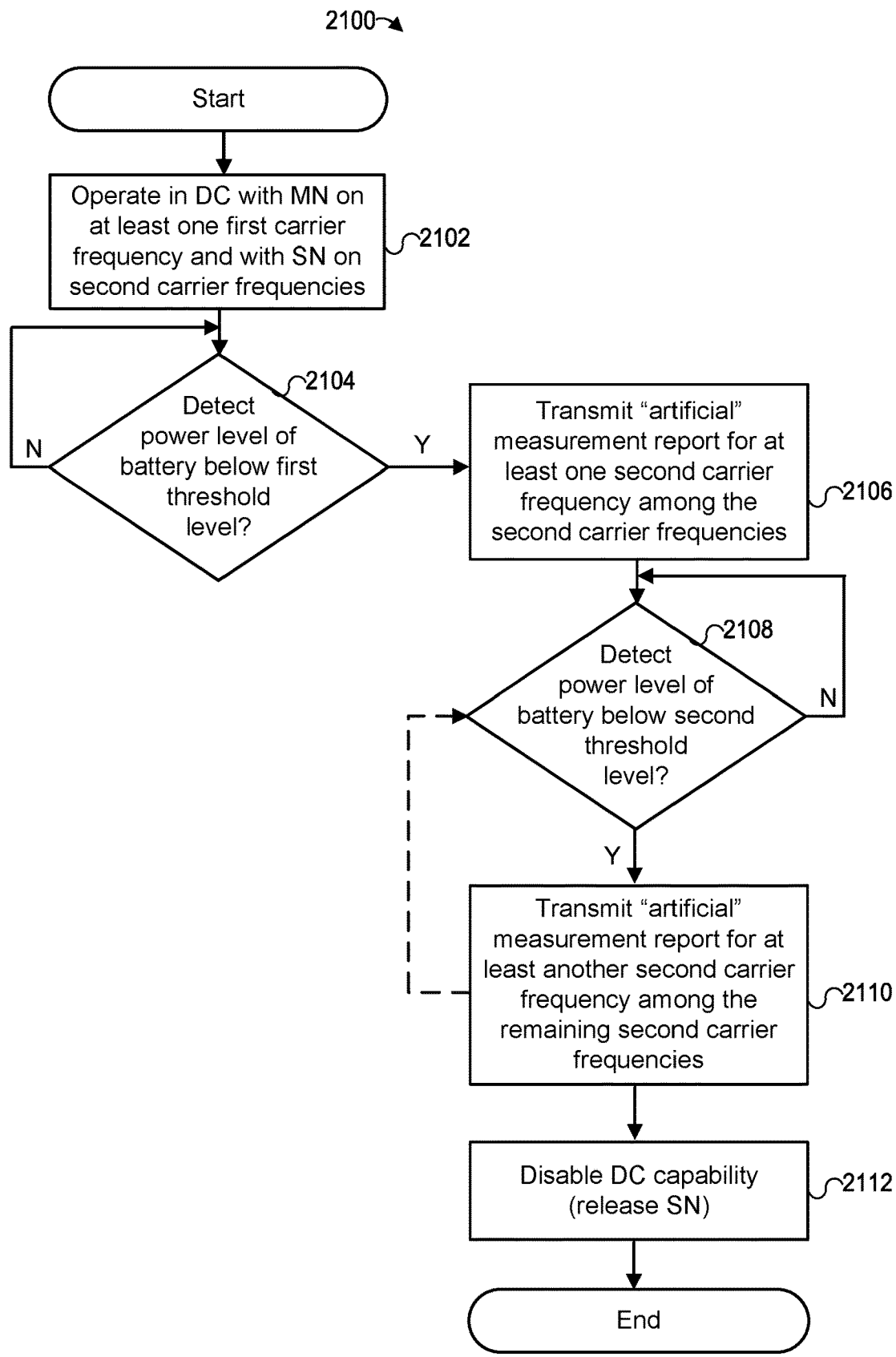
FIG. 21 is a flow diagram of an example scenario in which a UE releases one or more carrier frequencies of an SN in view of detecting a low-power condition of a battery.

FIG. 21 depicts an example method 2100 in which the UE 102 releases one or more carrier frequencies of the SN 106 in view of detecting a low-power condition of the battery 103.

The method 2100 begins at block 2102, where the UE 102 operates in DC with the MN 104 on at least one first carrier frequency of the MN 104 and the SN 106 on second carrier frequencies of the SN 106, similar to events 1502 and 1602 discussed above.

The UE 102 at block 2104 determines whether a low-power condition of the battery 103 (e.g., the remaining power level is below a first threshold level) has occurred, similar to events 1504 and 1604 discussed above. If the UE 102 does not detect a low-power condition, the UE 102 continues to determine whether a low-power condition has occurred.

If the UE 102 detects a low-power condition, the UE 102 at block 2106 transmits an "artificial" measurement report message to the MN 104 and/or the SN 106 that simulates to the MN 104 and/or the SN 106 low signal strength and/or low signal quality of at least one second carrier frequency of the SN 106, regardless of whether the signal strength and/or the signal quality are in fact low, similar to events 1507 and 1607 discussed above. Accordingly, the UE 102 suspends SCG transmission on the at least one second carrier frequency of the SN 106.

The UE 102 at block 2108 determines whether a low-power condition of the battery 103 has occurred, similar to events 1504 and 1604 discussed above. The low-power condition can be the same low-power condition (e.g., the remaining power level is below a first threshold level) as in block 2104 or a different low-power condition (e.g., the remaining power level is below a second threshold level that is lower than the first threshold level). If the UE 102 does not detect a low-power condition, the UE 102 continues to determine whether a low-power condition has occurred.

If the UE 102 detects a low-power condition, the UE 102 at block 2110 transmits another "artificial" measurement report message to the MN 104 and/or the SN 106 that simulates to the MN 104 and/or the SN 106 low signal strength and/or low signal quality of at least another second carrier frequency of the SN 106 among the remaining second carrier frequencies, regardless of whether the signal strength and/or the signal quality are in fact low, similar to events 1507 and 1607 discussed above.

In some implementations, if the UE 102 continues to detect a low-power condition at block 2110, the UE 102 can transmit yet another "artificial" measurement report message (i.e., a third "artificial" measurement report message) to the MN 104 and/or the SN 106 that simulate to the MN 104 and/or the SN 106 low signal strength and/or low signal quality of the remaining second carrier frequencies, regardless of whether the signal strength and/or the signal quality are in fact low. In some implementations, if the UE 102 continues to detect a low-power condition at block 2110, the UE 102 can iteratively transmit the third "artificial" measurement report message to the MN 104 and/or the SN 106 to indicate low signal strength and/or low signal quality of the remaining second carrier frequencies one-by-one until the UE 102 accounts for all remaining second carrier frequencies.

Block 2112 is similar to events 1506 and 1606 and block 1708 discussed above. In an implementation, the UE 102 can stop measuring some or all of the 5G NR carrier frequencies configured by a measurement configuration received from the MN 104 or the SN 106. Accordingly, the UE 102 can consume less power (even no power) by disabling DC operation (e.g., by turning off or deactivating one of the chips that supports the RAT of the SN 106). Further, the UE 102 can reduce (or prevent) heat generation from the chip supporting the RAT of the SN 106.

Although the method 2100 as illustrated in FIG. 21 completes after block 2110, in general the UE 102 can execute the method 2100 in an iterative manner, e.g., by "looping back" to block 2102 after executing block 2110.

Figure 22:
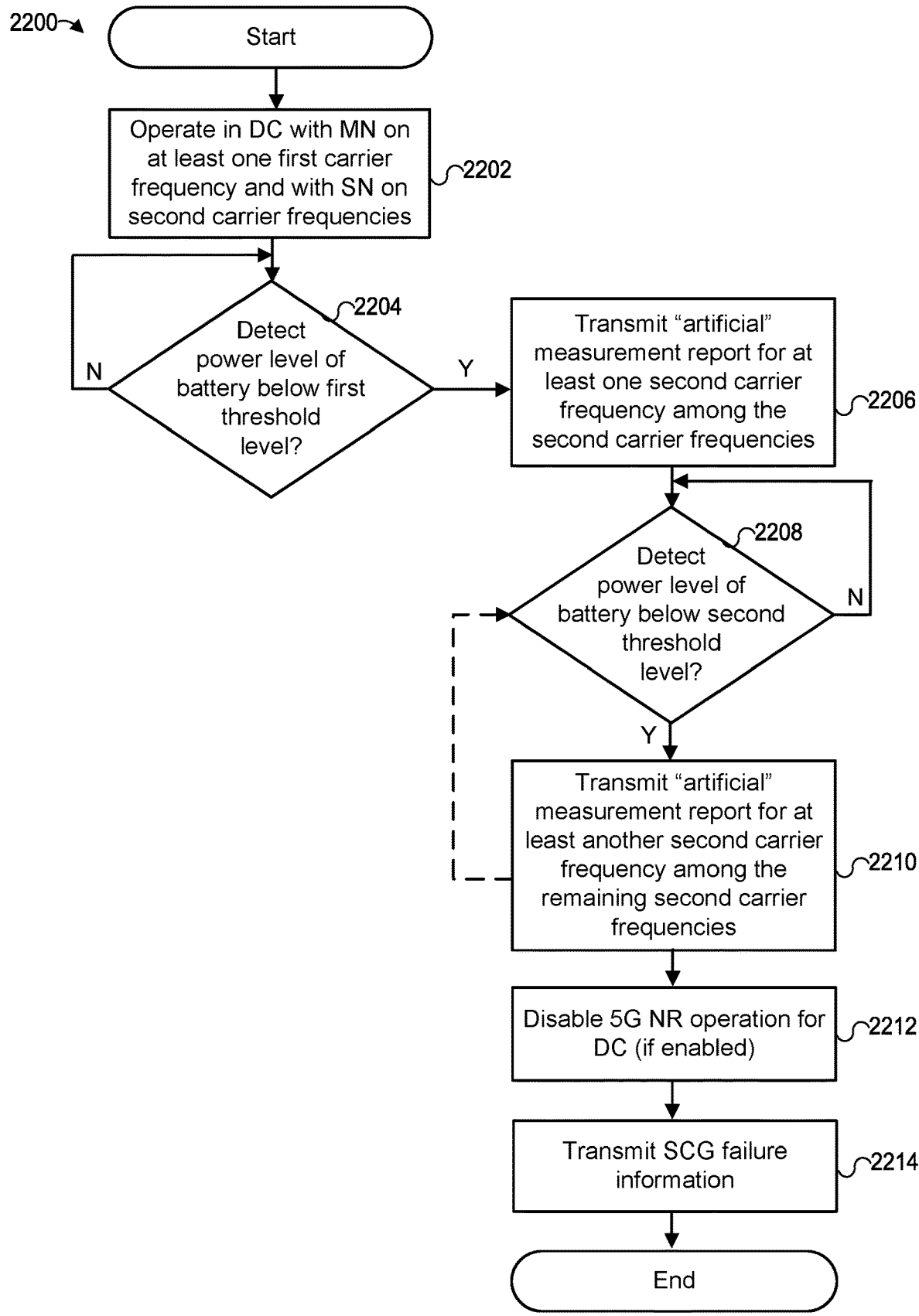
FIG. 22 is a flow diagram of an example scenario in which a UE prevents an MN from initiating an SN addition procedure in view of an "artificial" measurement report and indication of SCG failure.

FIG. 22 depicts an example method 2200 in which the UE 102 prevents the MN 104 from initiating an SN addition procedure in view of an "artificial" measurement report and indication of SCG failure.

The method 2200 begins at block 2202, where the UE 102 operates in DC with the MN 104 on at least one first carrier frequency of the MN 104 and the SN 106 on at least one second carrier frequency of the SN 106, similar to block 2102 discussed above.

Blocks 2204, 2206, 2208, 2210, and 2212 are similar to blocks 2104, 2106, 2108, 2210, and 2212 discussed above.

The UE 102 at block 2214 generates an indication of SCG failure (e.g., an SCG failure message) or an indication of MCG failure (e.g., an RRC reestablishment request message) to notify the MN 104 that the UE 102 will no longer be using DC, similar to events 1307 and 1407, respectively.

Although the method 2200 as illustrated in FIG. 22 completes after block 2212, in general the UE 102 can execute the method 2200 in an iterative manner, e.g., by "looping back" to block 2202 after executing block 2212.

Figure 23:
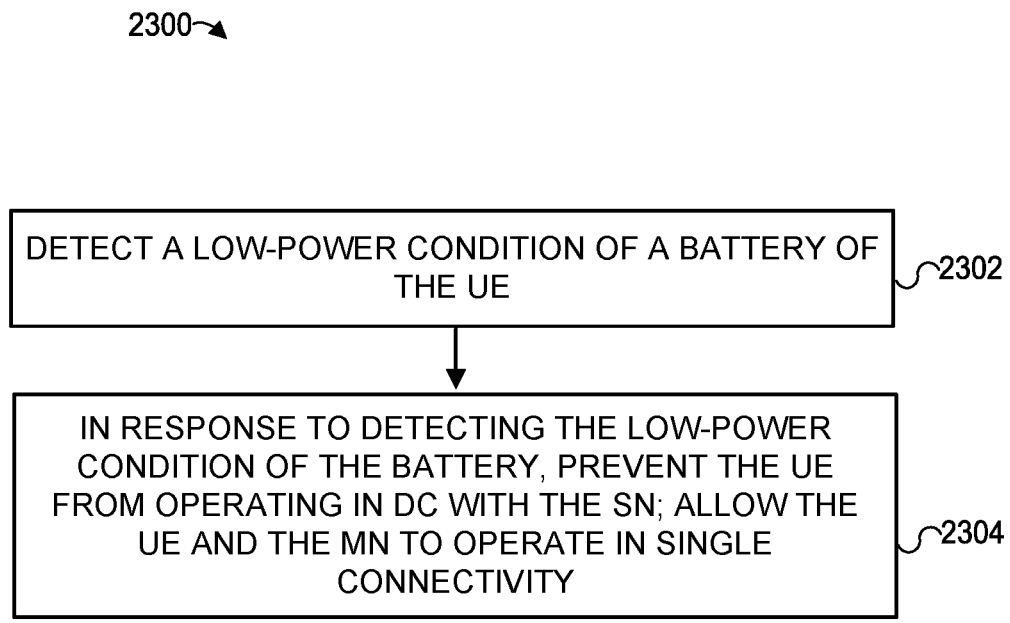
FIG. 23 is a flow diagram of an example method for preventing the UE from operating in DC in view of a low-power condition of the battery, which can be implemented in the UE of FIG. 1.

FIG. 23 depicts an example method 2300 for preventing the UE 102 from operating in DC in view of a low-power condition of the battery.

The method 2300 begins at block 2302, where the UE 102 detects a low-power condition of a battery 103 (blocks or events 202, 302, 406, 506, 606, 702, 802, 902, 1002, 1104, 1204, 1304, 1404, 1504, 1604, 1702, 1802, 1902, 2002, 2104, and 2204 of FIGS. 2-22). In response to detecting the low-power condition of a battery, the UE 102 at block 2304 prevents the UE 102 from operating in DC with the SN 106, so that the UE 102 and the MN 104 can operate only in SC. Particularly, the UE 102 at block 2304 prevents the UE 102 from operating in DC with the SN 106 by disabling DC capability, as described in blocks or events 208, 308, 408, 508, 608, 609, 708, 808, 908, 1008, 1106, 1206, 1207, 1306, 1406, 1506, 1606, 1708, 1806, 1906, 2008, 2112, and 2212 of FIGS. 2-22. In some implementations, the UE 102 at block 2304 prevents the UE 102 from operating in DC with the SN 106 by also disabling MN CA capability, as described in blocks or events 210, 310, 710, 810, 910, 1010, 1710, and 2010 of FIGS. 2-3, 8-10, 17, and 20.

The following additional considerations apply to the foregoing discussion.

"Carrier frequency" may be interchangeable with "cell," "secondary cell (SCell)" or "primary secondary cell (PSCell)." The cell or SCell may be an frequency division duplex (FDD) cell or a time division duplex (TDD) cell. In case of the TDD cell, the UE may be configured by the SN to receive downlink transmissions on a carrier frequency of the TDD cell but may or may not be configured to transmit uplink transmissions on the carrier frequency of the TDD cell. In case of the FDD cell, the UE may be configured by the SN to receive downlink transmissions on a downlink carrier frequency of the FDD cell but may or may not be configured to transmit uplink transmissions on an uplink carrier frequency of the FDD cell.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling DC based upon a low-power condition of a battery of a user device through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a in a user device (UE) capable of operating in dual-mode connectivity (DC) with a master node (MN) and a secondary node (SN), the method comprising: detecting, by processing hardware, a low-power condition of a battery of the UE; and in response to detecting the low-power condition of the battery: preventing, by the processing hardware, the UE from operating in DC with the SN, so that the UE and the MN are configured to operate in single connectivity.

Aspect 2. The method of aspect 1, wherein preventing the UE from operating in DC includes transmitting, from the UE to the MN, an indication that the UE has disabled DC.

Aspect 3. The method of aspect 2, wherein further comprising, prior to detecting the low-power condition of the battery: transmitting, from the UE to the MN, an indication that the UE has enabled DC.

Aspect 4. The method of aspect 2 or 3, wherein transmitting the indication that the UE has disabled DC or the indication the UE has enabled DC includes transmitting, from the UE to the MN, a UE capability information message.

Aspect 5. The method of aspect, wherein transmitting the UE capability information message includes: generating a radio access capability information element (IE); and including a DC band combination in the radio access capability IE to indicate that the UE has enabled DC, and not including a DC band combination in the radio access capability IE to indicate that the UE has disabled DC.

Aspect 6. The method of aspect 4, wherein transmitting the UE capability information message includes: generating a radio access capability IE; and including at least one of a DC support indicator or a list of DC-supported bands in the radio access capability IE to indicate that the UE has enabled DC, and not including a DC support indicator or a list of DC-supported bands in the radio access capability IE to indicate that the UE has disabled DC.

Aspect 7. The method of aspect 4, wherein transmitting the UE capability information message includes: including a radio access capability IE in the UE capability information message to indicate that the UE has enabled DC, and not including a radio access capability IE in the UE capability information message to indicate that the UE has disabled DC.

Aspect 8. The method of aspect 1, wherein preventing the UE from operating in DC includes suspending measurements on a carrier frequency of the SN.

Aspect 9. The method of aspect 1 or 8, wherein preventing the UE from operating in DC includes suspending reports of measurements on a carrier frequency of the SN.

Aspect 10. The method of aspect 1, wherein the MN operates using a first radio access technology (RAT), and the second SN operates using a second RAT, and wherein preventing the UE from operating in DC includes: disabling a chip of the UE that supports communication according to the second RAT.

Aspect 11. The method of any of the preceding aspects, further comprising: disabling MN carrier aggregation (CA) in response to detecting the low-power condition of the battery.

Aspect 12. The method of aspect 11, further comprising: generating a radio access capability IE; and including an MN CA band combination in the radio access capability IE to indicate that the UE has enabled MN CA, and not including an MN CA band combination in the radio access capability IE to indicate that the UE has disabled MN CA.

Aspect 13. The method of aspect 11, wherein the low-power condition of the battery comprises a first threshold level and a second threshold level, and wherein: preventing the UE from operating in DC is in response to detecting that a power level of the battery is below the first threshold level, and disabling MN CA is in response to that the power level of the battery is below the second threshold level lower than the first threshold level.

Aspect 14. The method of any of the preceding aspects, further comprising, subsequently to preventing the UE from operating in DC: in response to determining that the low-power condition no longer applies, enabling the UE to operate in DC with the SN.

Aspect 15. The method of any of the preceding aspects, wherein detecting the low-power condition at the UE includes determining that a power level of a battery of the UE is below a threshold level.

Aspect 16. The method of aspect 15, further comprising, subsequently to detecting the low-power condition: in response to detecting, by the processing hardware, that the battery of the UE is receiving a charge from a power source, determining that the low-power condition no longer applies.

Aspect 17. The method of aspect 15, further comprising, subsequently to detecting the low-power condition: in response to detecting, by the processing hardware, that the power level of the battery of the UE is above the threshold level, determining that the low-power condition no longer applies.

Aspect 18. The method of aspect 1, further comprising, in response to detecting the low-power condition of the battery: determining that the UE currently is in a connected state according to a protocol for controlling radio resources; in a first instance, in response to determining that an operational condition is not met, immediately preventing the UE from operating in DC; and in a second instance, in response to determining that the operational condition is met, postponing the preventing the UE from operating in DC until the operational condition is met.

Aspect 19. The method of aspect 18, wherein the operational condition is one of: (i) the UE currently is engaged in a voice or video call, (ii) a screen of the UE is on, or (iii) a power-saving feature of the UE has been deactivated.

Aspect 20. A UE including processing hardware and configured to implement a method according to any of aspect 1-19.

Aspect 21. A UE capable of operating in dual-mode connectivity (DC) with a master node (MN) and a secondary node (SN), the UE comprising: a battery; a controller; and a memory coupled to the controller and configured to store computer-executable instructions that, when executed by the controller, cause the controller to: detect a low-power condition of the battery of the UE; and in response to detecting the low-power condition of the battery, prevent the UE from operating in DC with the SN, so that the UE and the MN are configured to operate in single connectivity.

Aspect 22. The UE of aspect 21, wherein the memory is further configured to store a predetermined threshold level corresponding to a predetermined remaining battery capacity; and the instructions, when executed by the controller, cause the controller to detect a low-power condition of the battery by comparing a status of the battery with the predetermined threshold level.

Aspect 23. The UE of aspect 21, further comprising: a first module that supports communication with the MN using a first radio access technology (RAT); a second module that supports communication with the SN using a second RAT, wherein the instructions, when executed by the controller, cause the controller to prevent the UE from operating in DC with the SN by enabling the first module and disabling the second module.

Aspect 24. The UE of aspect 21, wherein the instructions, when executed by the controller, cause the controller to prevent the UE from operating in DC with the SN by transmitting an indication that the UE has disabled DC to the MN.

Aspect 25. The UE of aspect 21, wherein the instructions, when executed by the controller, cause the controller to prevent the UE from operating in DC with the SN by transmitting an indication of a failure of a secondary cell group (SCG) associated with the SN to the MN.

Aspect 26. The UE of aspect 21, wherein the instructions, when executed by the controller, cause the controller to prevent the UE from operating in DC with the SN by transmitting an indication of a failure of a master cell group (MCG) associated with the MN to the MN.

Aspect 27. The UE of aspect 21, wherein the instructions, when executed by the controller, cause the controller to: detect that the UE is connected to a power source; and in response to detecting that the UE is connected to the power source, enable the UE to operate in DC with the SN.

Aspect 28. A method in a user device (UE) capable of operating in dual-mode connectivity (DC) with a master node (MN) and a secondary node (SN), the method comprising: detecting, by processing hardware, a low-power condition of a battery of the UE; and in response to detecting the low-power condition of the battery: preventing, by the processing hardware, the UE from operating in DC with the SN, so that the UE and the MN are configured to operate in single connectivity.

Aspect 29. The method of aspect 28, wherein preventing the UE from operating in DC includes transmitting, from the UE to the MN, an indication of a failure of a secondary cell group (SCG) associated with the SN.

Aspect 30. The method of aspect 29, wherein transmitting the indication of the failure of the SCG includes transmitting, from the UE to the MN, an SCG failure message.

Aspect 31. The method of aspect 30, wherein the SCG failure message includes a measurement result including a signal strength or signal quality of a carrier frequency of the SN.

Aspect 32. The method of aspect 30, further comprising: receiving an RRC reconfiguration message from the MN in response to the SCG failure message; and releasing a configuration for communicating with the SN in response to the RRC reconfiguration message.

Aspect 33. The method of aspect 29, wherein transmitting the indication of the failure of the SCG includes: including, in the indication, a failure type indicator corresponding to the low-power condition of the battery.

Aspect 34. The method of aspect 29, wherein transmitting the indication of the failure of the SCG includes: including, in the indication, a failure type indicator set to t310-Expiry, randomAccessProblem, rlc-MaxNumRetx, synchReconfigFailure-SCG, scg-reconfigFailure, or srb3-IntegrityFailure.

Aspect 35. The method of aspect 28, wherein preventing the UE from operating in DC includes transmitting, from the UE to the MN, an indication of a failure of a master cell group (MCG) associated with the MN.

Aspect 36. The method of aspect 35, wherein transmitting the indication of the failure of the MCG includes transmitting, from the UE to the MN, an RRC reestablishment request message.

Aspect 37. The method of aspect 36, wherein the RRC reestablishment request message includes a measurement result including a signal strength or signal quality of a carrier frequency of the SN.

Aspect 38. The method of aspect 36, further comprising: receiving an RRC reestablishment message from the MN in response to the RRC reestablishment request message; transmitting an RRC reestablishment complete message to the MN in response to the RRC reestablishment message; and causing the MN to initiate release of the SN in response to the RRC reestablishment complete message.

Aspect 39. The method of aspect 35, wherein transmitting the indication of the failure of the MCG includes: including, in the indication, a failure type indicator corresponding to the low-power condition of the battery.

Aspect 40. The method of aspect 35, wherein transmitting the indication of the failure of the MCG includes: including, in the indication, a failure type indicator set to reconfigurationFailure, handoverFailure, otherFailure.

What is claimed is:

1. A method in a user device (UE) capable of operating in dual-mode connectivity (DC) with a master node (MN) and a secondary node (SN), the method comprising:
   detecting, by processing hardware, a low-power condition of a battery of the UE; and
   in response to detecting the low-power condition of the battery:
      preventing, by the processing hardware, the UE from operating in DC with the SN, so that the UE and the MN are configured to operate in single connectivity, wherein preventing includes providing simulated signal strength measurements to at least one of the MN and the SN.

2. The method of claim 1, wherein preventing the UE from operating in DC includes suspending measurements on a carrier frequency of the SN.

3. The method of claim 1, wherein preventing the UE from operating in DC includes suspending reports of measurements on a carrier frequency of the SN.

4. The method of claim 1, wherein the MN operates using a first radio access technology (RAT), and the SN operates using a second RAT, and wherein preventing the UE from operating in DC includes:
   disabling a chip of the UE that supports communication according to the second RAT.

5. The method of claim 1, further comprising:
   disabling MN carrier aggregation (CA) in response to detecting the low-power condition of the battery.

6. The method of claim 5, wherein the low-power condition of the battery comprises a first threshold level and a second threshold level, and wherein:
   preventing the UE from operating in DC is in response to detecting that a power level of the battery is below the first threshold level, and
   disabling MN CA is in response to that the power level of the battery is below the second threshold level lower than the first threshold level.

7. The method of claim 1, further comprising, subsequently to preventing the UE from operating in DC:
   in response to determining that the low-power condition no longer applies, enabling the UE to operate in DC with the SN.

8. The method of claim 1, wherein detecting the low-power condition at the UE includes determining that a power level of a battery of the UE is below a threshold level.

9. The method of claim 8, further comprising, subsequently to detecting the low-power condition:
   in response to detecting, by the processing hardware, that the battery of the UE is receiving a charge from a power source, determining that the low-power condition no longer applies.

10. The method of claim 8, further comprising, subsequently to detecting the low-power condition:
    in response to detecting, by the processing hardware, that the power level of the battery of the UE is above the threshold level, determining that the low-power condition no longer applies.

11. The method of claim 1, further comprising, in response to detecting the low-power condition of the battery:
    determining that the UE currently is in a connected state according to a protocol for controlling radio resources;
    in a first instance, in response to determining that an operational condition is not met, immediately preventing the UE from operating in DC; and
    in a second instance, in response to determining that the operational condition is met, postponing the preventing the UE from operating in DC until the operational condition is met.

12. The method of claim 11, wherein the operational condition is one of:
    (i) the UE currently is engaged in a voice or video call,
    (ii) a screen of the UE is on, or
    (iii) a power-saving feature of the UE has been deactivated.

13. A UE including processing hardware and configured to implement a method according to claim 1.

14. A UE capable of operating in dual-mode connectivity (DC) with a master node (MN) and a secondary node (SN), the UE comprising:
    a battery;
    a controller; and
    a memory coupled to the controller and configured to store computer-executable instructions that, when executed by the controller, cause the controller to:
       detect a low-power condition of the battery of the UE; and
       in response to detecting the low-power condition of the battery, prevent the UE from operating in DC with the SN, so that the UE and the MN are configured to operate in single connectivity, wherein preventing includes providing simulated signal strength measurements to at least one of the MN and the SN.

15. The UE of claim 14, wherein the memory is further configured to store a predetermined threshold level corresponding to a predetermined remaining battery capacity; and
    the instructions, when executed by the controller, cause the controller to detect a low-power condition of the battery by comparing a status of the battery with the predetermined threshold level.

16. The UE of claim 14, further comprising:
    a first module that supports communication with the MN using a first radio access technology (RAT);
    a second module that supports communication with the SN using a second RAT,
    wherein the instructions, when executed by the controller, cause the controller to prevent the UE from operating in DC with the SN by enabling the first module and disabling the second module.

17. The UE of claim 14, wherein the instructions, when executed by the controller, cause the controller to prevent the UE from operating in DC with the SN by transmitting an indication that the UE has disabled DC to the MN.

18. The UE of claim 14, wherein the instructions, when executed by the controller, cause the controller to:
    detect that the UE is connected to a power source; and
    in response to detecting that the UE is connected to the power source, enable the UE to operate in DC with the SN.

* * * * *